United States Patent [19]

Miki et al.

[11] Patent Number: 4,669,745
[45] Date of Patent: Jun. 2, 1987

[54] APPARATUS FOR CONTROLLING STEERING ANGLE OF REAR WHEELS OF A VEHICLE

[75] Inventors: Kazuo Miki, Aichi; Katsuhiko Fukui, Nagoya; Yasutaka Hayashi, Seto; Michio Ishiguro, Toyota; Kazumasa Sumi, Nagoya; Kazukata Takei, Toyota, all of Japan

[73] Assignee: Kabushiki Kaisha Toyota Chuo Kenkyusho, Aichi, Japan

[21] Appl. No.: 782,051

[22] Filed: Sep. 30, 1985

[30] Foreign Application Priority Data

Oct. 3, 1984 [JP] Japan .................................. 59-207876
Nov. 19, 1984 [JP] Japan .................................. 59-243856

[51] Int. Cl.$^4$ .............................................. B62D 6/02
[52] U.S. Cl. ..................................... 280/91; 180/140
[58] Field of Search ....................... 280/91, 98, 99, 96, 280/103; 180/140, 234, 79, 141, 142, 236

[56] References Cited

U.S. PATENT DOCUMENTS 4,146,244  3/1979  Presley ................................... 280/96
4,541,499  9/1985  Yanai ..................................... 180/142
4,572,316  2/1986  Kanazawa et al. .................... 280/91

Primary Examiner—John J. Love
Assistant Examiner—Karin Ferriter
Attorney, Agent, or Firm—Parkhurst & Oliff

[57] ABSTRACT

An apparatus for controlling steer angle of rear wheels of a 4-wheel steering vehicle in accordance with the operation of a steering wheel for generating steer angle of front wheels. The apparatus comprises a first member which moves in response to the operation of the steering wheel; a second member which moves in response to the operation of the steering wheel in a direction counter to that of the first member; an output shaft for controlling the steer of the rear wheels; a resilient member disposed between the first member and the output shaft and a controller disposed between the second member and the output shaft for controlling the direction of movement of the output shaft in accordance with the speed of operation of the steering wheel. When the steering wheel is operated at high speed, the resilient member absorbs the force from the first member so that the output shaft moves in the same direction as the second member, whereby the rear wheels are turned in a direction counter to that of the front wheels. When the steering wheel is operated at low speed, the force from the second member is damped so that the output shaft moves in the same direction as the first member, whereby the rear wheels are turned in the same direction as the front wheels.

24 Claims, 49 Drawing Figures

REAR WHEEL STEERING JUDGING MECHANISM 1

REAR WHEEL STEERING
JUDGING MECHANISM I

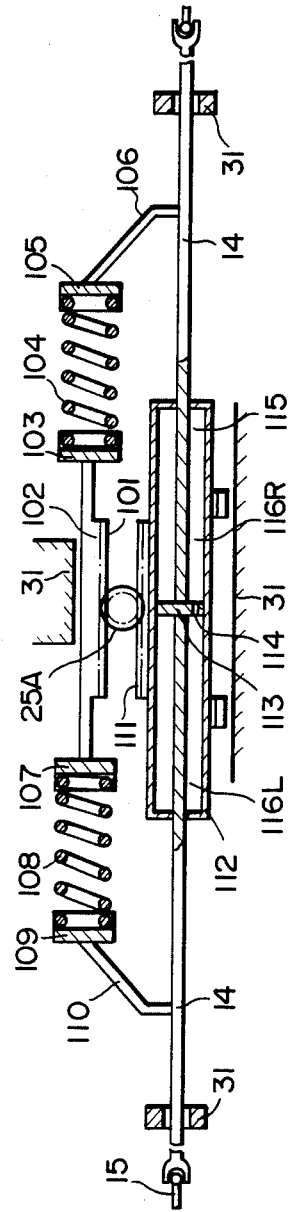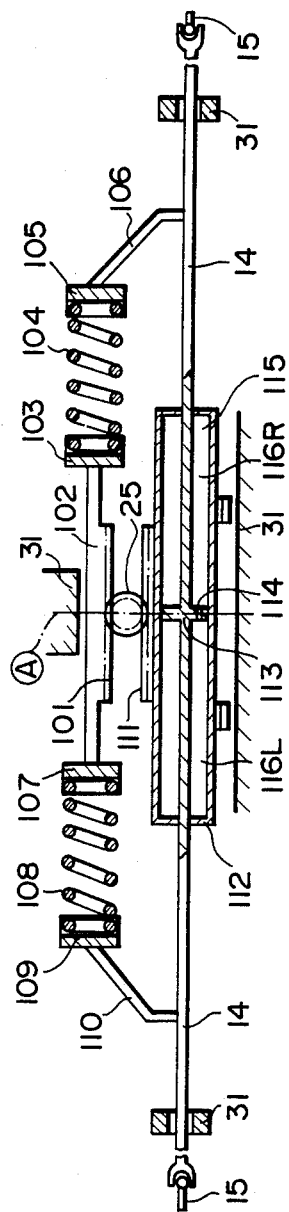

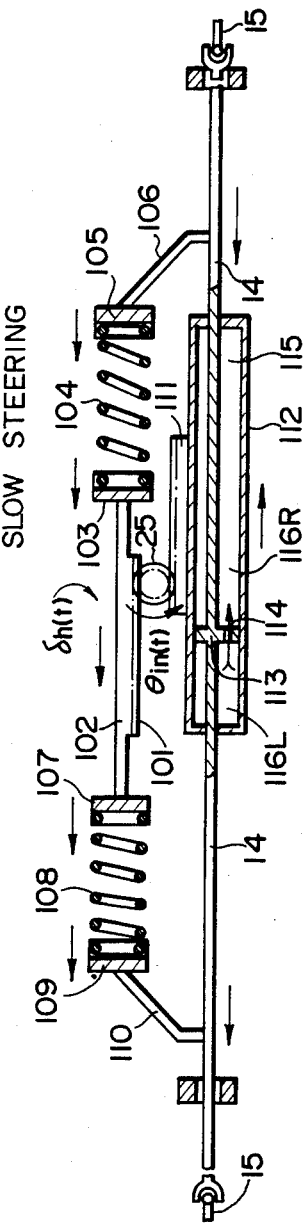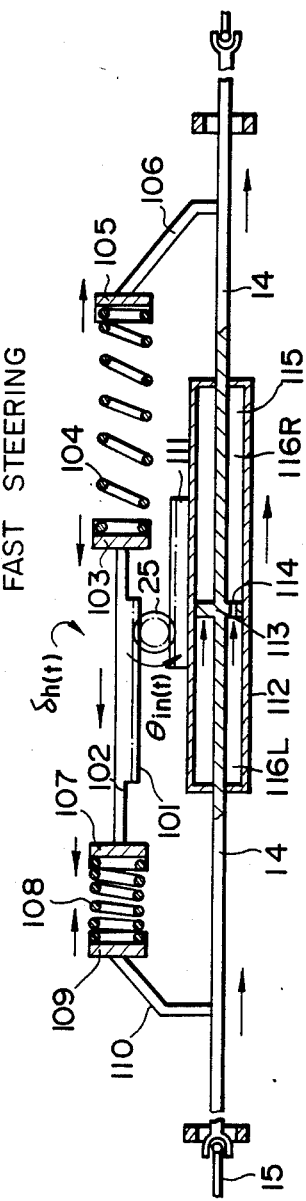

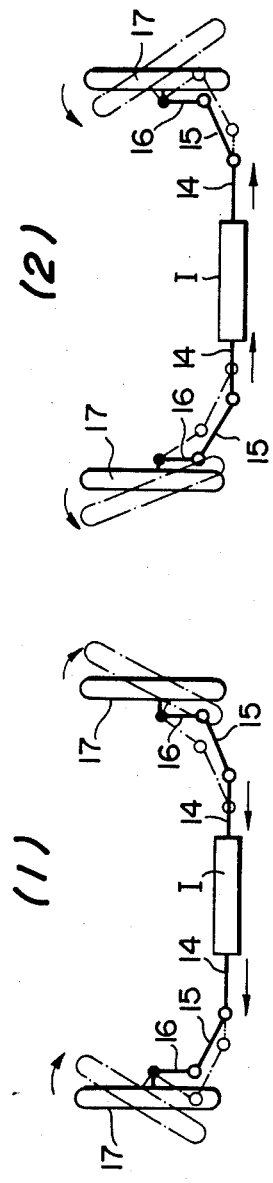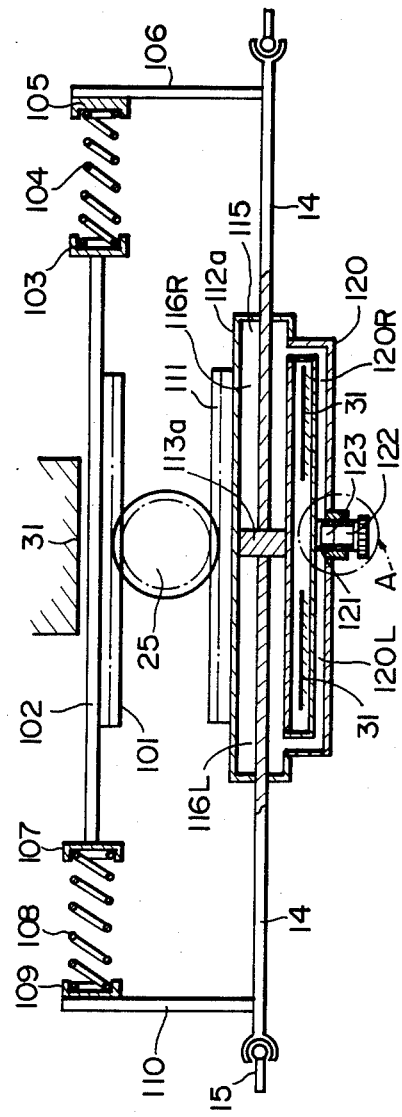

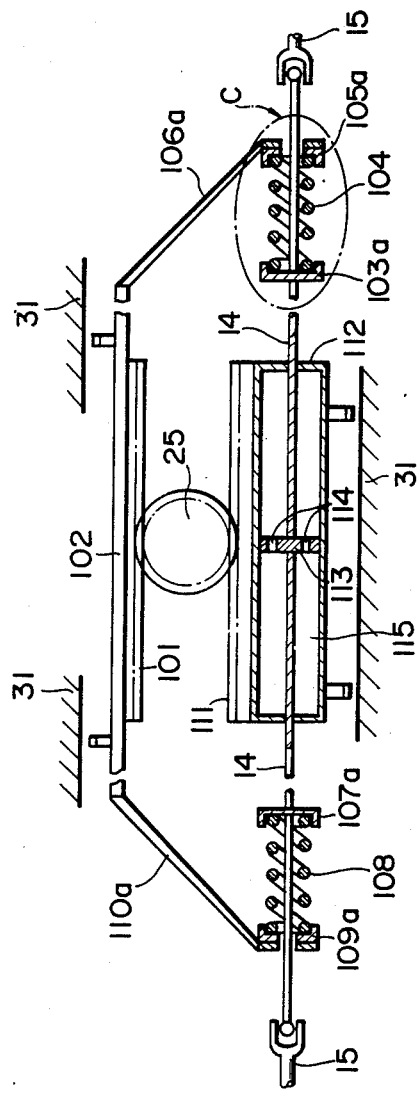

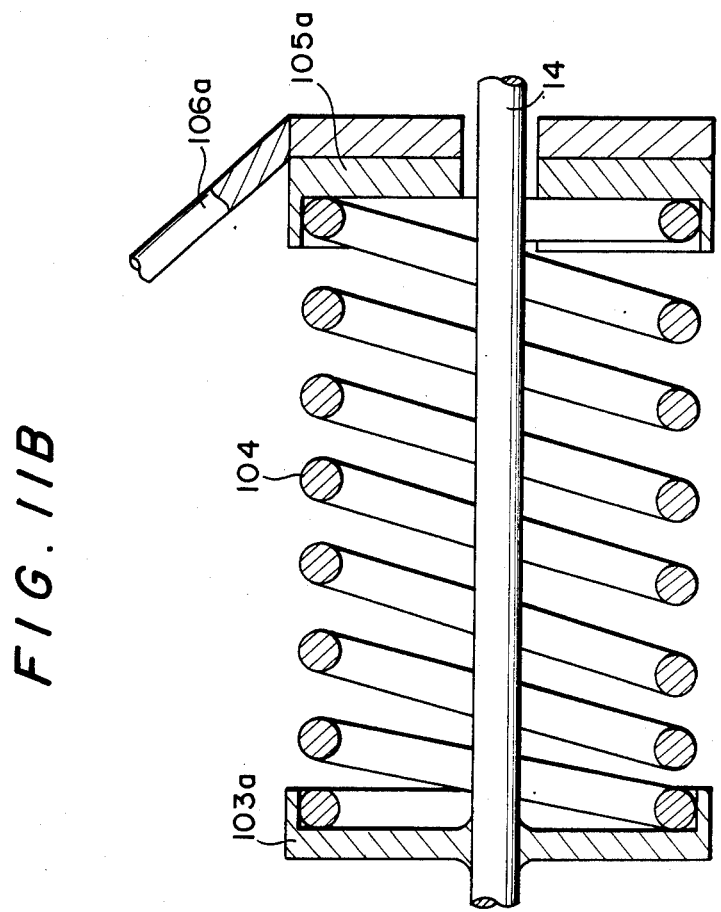

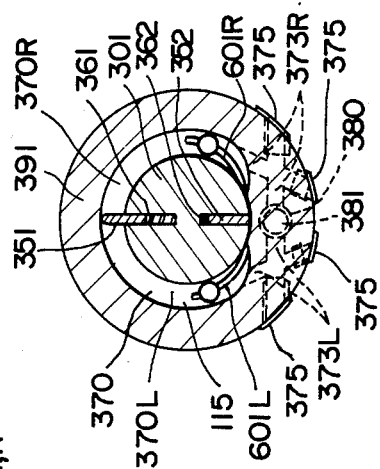
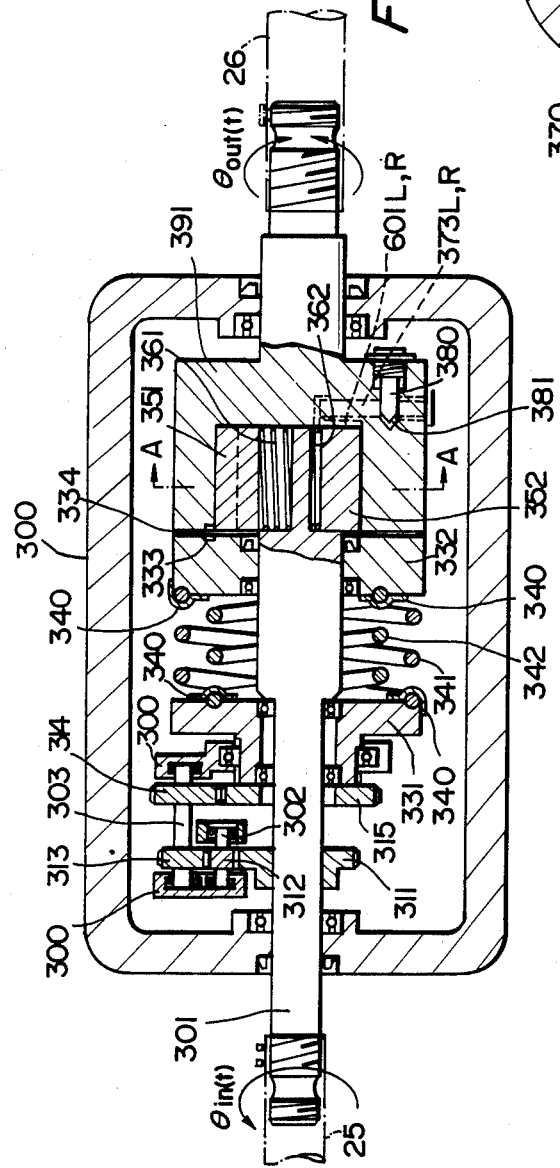
FIG. 14A
FIG. 14B

SLOW STEERING

FAST STEERING

SLOW STEERING

FAST STEERING

FIG. 20A

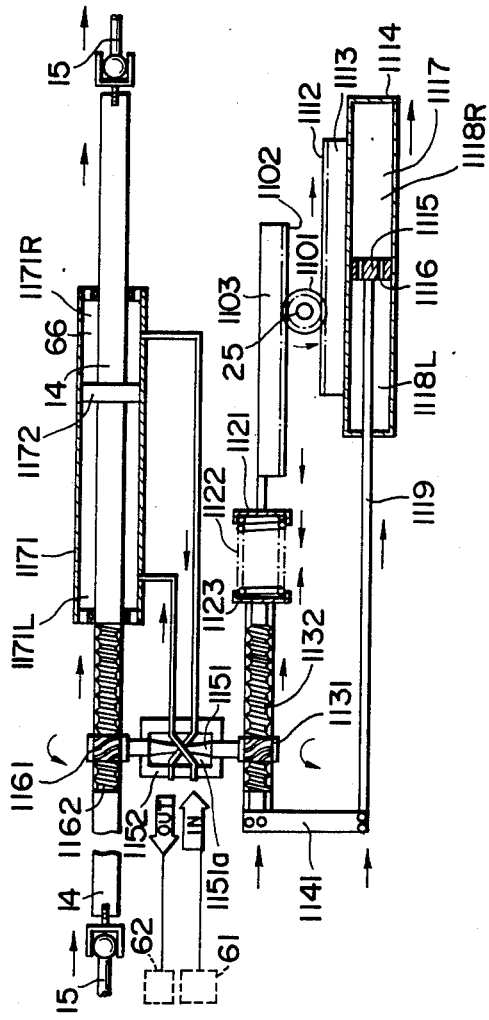

APPARATUS FOR CONTROLLING STEERING ANGLE OF REAR WHEELS OF A VEHICLE

BACKGROUND OF THE INVENTION

1. Field of the Invention

The present invention relates to an apparatus for controlling the steer angle of rear wheels of a vehicle of the type having steerable front and rear wheels (referred to as 4-wheel steering vehicle, hereinunder) and, more particularly, to a rear wheel steer angle control apparatus for 4-wheel steering vehicle, wherein an actuating mechanism for generating steer angle of rear wheels is controlled in accordance with the manner of operation of the steering wheel for steering the front wheels, thus automatically controlling the steer angle of the rear wheels.

2. Description of the Related Art

A known rear wheel steer angle controlling apparatus for 4-wheel steering vehicle, on which the present invention is based, is shown in Japanese Patent Laid-Open No. 44568/1982. This apparatus will be described hereinunder with reference to FIG. 2.

A shaft 2 is rotated in response to a rotational displacement of a steering wheel 1. The rotation of the shaft 2 is transmitted to a gear box 3 and is converted into a linear motion of linkages 4, which in turn causes knuckle arms 6 to pivot about pivot shafts 6a, so that front wheels 7 are steered at an angle δf(t) as a function of time (t). The rotational displacement δh(t) of the steering wheel 1 is detected by a sensor S1 mounted on the shaft 2, while another sensor S2 senses a lateral acceleration V which is generated in the vehicle in response to the rotational displacement δh(t) of the steering wheel 1. A computer 8 activates an actuator 9 in accordance with the signals from the sensors S1 and S2, such as to impart linear motion to linkages 14 through another gear box 10. The linear motion of the linkages 14 causes knuckle arms 16 to pivot about pivot shafts 16a so that rear wheels 17 are steered at an angle δr(t). The angle δr(t) of steer of the rear wheels is determined by the computer 8 in proportion to the lateral acceleration $\dot{V}$ as follows.

$$\delta r(t) = K \cdot \dot{V} \tag{1}$$

Alternatively, the rear wheel steer angle δr(t) is determined as the sum of the right-hand side of the above formula (1) and the product h·δf(t) of the front wheel steer angle δf(t) and a proportional constant h as follows.

$$\delta r(t) = h \cdot \delta f(t) + K \cdot \dot{V} \tag{2}$$

Apart from the known apparatus shown in FIG. 2, a 4-wheel steering vehicle has been proposed in which the steering device for steering the front wheels and the steering device for steering the rear wheels are mechanically connected to each other, wherein the angle of steer of rear wheels is controlled such that, when the rotational displacement of the steering wheel is small, the rear wheels are steered in the same direction as the front wheels, whereas, when the rotational displacement of the steering wheel is large, the rear wheels are steered in the direction counter to the direction of steer of the front wheels.

The known controlling apparatus for controlling the rear wheel steering angle in accordance with the lateral acceleration, however, does not sufficiently make use of the speed of operation of the steering wheel, so that this type of controlling apparatus does not provide any improvement in the response to the steering input for sharp turning of the vehicle at small radius of turning, although this controlling apparatus appreciably improves the running stability and facilitates the correction of steering operation during straight running of the vehicle at medium and high speed range by virture of the fact that the rear wheels are steered in the same direction as the front wheels regardless of the rotational displacement of the vehicle.

The other type of known controlling apparatus for controlling the rear wheel steer angle in accordance with the rotational displacement of the steering wheel involves a problem in that, since this type of apparatus also does not take into account the speed of operation of the steering wheel, the direction and angle of steer of the rear wheels is definitely determined by the rotational displacement of the steering wheel, regardless of whether the driver is expecting a sharp response of vehicle to quick steering input for averting from any obstacle or for lane change, or expecting a gentle turning of the vehicle as in the case of running along a curve of a large radius of curvature.

Thus, the conventional rear wheel steer angle controlling apparatus could not provide steering effect in accordance with the speed of operation of the steering wheel, thus failing to meet various steering demand of the driver.

SUMMARY OF THE INVENTION

Accordingly, an object of the invention is to provide an apparatus for controlling rear wheel steer angle which is improved to control the rear wheel steer angle taking into account also the speed of operation of the steering wheel, in such a manner as to improve the response to turning steering input where a sharp turn of the vehicle is required in response to quick steering operation and to maintain a high running stability where a gentle turning of the vehicle is required, thereby overcoming the above-described problems of the prior art.

In general, the turning sensitivity of the vehicle in response to the steering input is increased as the vehicle speed becomes higher, so that the running direction of the vehicle is largely changed even by a small steering wheel displacement when the vehicle is running at a high speed.

Therefore, another object of the invention is to provide an apparatus for controlling the steer angle of rear wheels in which the direction or angle of steer of the rear wheels is controlled in accordance with the vehicle running speed such as to prevent any drastic increase in the turning sensitivity of the vheicle in response to the steering input, thereby ensuring a high running stability during high speed running of the vehicle.

To these ends, according to a first form of the invention, there is provided an apparatus for controlling steer angle of rear wheels of a vehicle in accordance with the operation of a steering wheel for generating steer angle of front wheels, the apparatus comprising: a first member movable in response to the operation of the steering wheel; a second member movable in response to the operation of the steering wheel in the counter direction to the direction of movement of the first member; an output shaft for controlling the steer angle of the rear wheels; a resilient member disposed between the first member and the output shaft; and a controlling means disposed between the second member and the output shaft and for controlling a direction of movement of the output shaft in accordance with a speed of operation of the steering wheel. In this apparatus, the controlling means is adapted to cause, when the steering wheel is being operated at high speed, output shaft movement in the same direction as the movement of the second member by transmitting a force of the second member to the output shaft by causing the resilient member to be resiliently deformed such as to absorb a force from the first member, whereas, when the steering wheel is being operated at low speed, the controlling means damps the force from the second member such as to allow the force from the first member to be transmitted to the output shaft through the resilient member so that the output shaft is moved in the same direction as the movement of the first member. As a result, the steer angle of the rear wheel is formed in a direction counter to a direction of the steer angle of the front wheel when the steering wheel is being operated at the high speed, while, when the steering wheel is being operated at the low speed, the steer angle of the rear wheel is generated in the same direction as the steer angle of the front wheels.

According to a practical form of the invention, there is provided an apparatus for controlling steer angle of rear wheels of a vehicle of the type mentioned above, wherein the control means includes a dash pot means filled with a fluid and incorporating an orifice which imposes a flow resistance on the fluid due to viscosity of the fluid, in such a manner as to drive the output shaft in the direction of movement of the second member when the second member is moving at the high speed and to drive the same in the same direction as the movement of the first member when the second member is moved at the low speed.

With this arrangement, the mechanism constituted by the resilient (elastic) member and the dash pot judges the speed of operation of the steering wheel. This mechanism then determines, in accordance with the speed of operation of the steering wheel and the steering wheel displacement angle, the direction and angle of steer of the rear wheels and controls the actuator mechanism such as to impart the thus determined direction and angle of steer to the rear wheels. According to this form of the invention, therefore, it is possible to determine and control the direction and angle of steer of the rear wheels with a comparatively simple mechanism having a high safety and reliability.

According to another form of the invention, there is provided an apparatus for controlling steer angle of rear wheels of a vehicle of the type as the first form, further comprising an actuating mechanism provided between the rear wheels and the controlling means, the actuating mechanism including an actuator connected at its output side to steering linkages and having two chambers separated by a piston, a hydraulic pressure generating means, and a control valve which is adapted to switch the communication passages between the hydraulic pressure generating means and the two chambers of the actuator in accordance with the direction of movement of the output shaft.

With this arrangement, it is possible to hydraulically steer the rear wheels with optimized power and with high accuracy and response characteristics.

According to still another aspect of the invention, there is provided an apparatus for controlling the steer angle of rear wheels of the same type as the second form, further comprising a physical amount detecting means for detecting a physical amount relating to the vehicle speed, and an orifice control means adapted to maximize and minimize the cross-sectional area of the passage in the orifice, respectively, when the physical amount is large and small, respectively, wherein, when the cross-sectional area is maximized, the rear wheels are steered in the same direction as the front wheels regardless of the speed of operation of the steering wheel, whereas, when the cross-sectional area of the orifice is minimized, the rear wheels are steered in the counter direction to the direction of steer of the front wheels regardless of the speed of operation of the front wheels.

With this arrangement, the damping force of the dash pot is automatically controlled in response to the change in the state of running of the vehicle, in such a way as to automatically adjust the direction and angle of steer of the rear wheels, thus optimizing the running properties of the vehicle. Namely, when the vehicle is running at a low speed, the front wheels and the rear wheels are steered in opposite directions such as to improve the turning performance of the vehicle, whereas, during high-speed running of the vehicle, the rear wheels are steered in the same direction as the front wheels such as to avoid any drastic increase in the sensitivity in response to the steering input, thus improving the steering stability. In addition, when the vehicle is running at a medium speed, the direction of steer of the rear wheels is controlled in accordance with the speed of operation of the steering wheel such that, when the steering wheel is being operated quickly, the steering gain is increased to increase the response to the sharp turning steering input, while, when the steering wheel is being operated gently, the steering gain is decreased to prevent any yaw and oscillation of the vehicle, thus improving the running stability during straight running of the vehicle.

According to a further form of the invention, there is provided an apparatus for controlling steer angle of rear wheels of a vehicle for controlling the steer angle of rear wheels of the vehicle in response to the operation of the steering wheel for generating the steer angle of front wheels of the vehicle, the apparatus comprising: a rear wheel steer judging means adapted to switch a hydraulic circuit in a control valve upon judging the speed of operation of the steering wheel such that, when the steering wheel is being operated quickly, a rear wheel steer angle is generated in the direction opposite to the direction of steer of the front wheels, whereas, when the steering wheel is being operated gently, a rear wheel steer angle is generated in the direction counter to the direction of steer of the front wheels; and an actuator means including a cylinder through which is extended a linkage connected to the rear wheels, a piston which divides the space in said cylinder into two chambers, a hydraulic pressure generator adapted to be driven by the engine of the vehicle such as to generate a hydraulic pressure, and the control valve adapted to be operated by the rear wheel steer judging means such as to bring the hydraulic pressure generator selectively to one of the chambers in the cylinder.

With this arrangement, it is possible to steer the rear wheels securely and and at a high response to the steering input by virtue of the hydraulic power.

These and other objects, features and advantages of the invention will become clear from the following description when the same is read in conjunction with the accompanying drawings.

BRIEF DESCRIPTION OF THE DRAWINGS

FIG. 5B is a fragmentary sectional view of the vehicle as viewed in the direction of arrows A—A in FIG. 5A;

FIGS. 6A, 6B and 6C are sectional views illustrating the operation of the first embodiment;

FIG. 6D is a diagram showing the directions of steer of rear wheels in accordance with the first embodiment;

FIG. 7A is a sectional view of a second embodiment of the invention, showing in particular the portion corresponding to that of the first embodiment shown in FIG. 5B;

FIG. 11A is a sectional view of a fourth embodiment of the invention, showing in particular the portion corresponding to the portion of the first embodiment shown in FIG. 5B;

FIG. 11B is an enlarged view of a portion "C" shown in FIG. 11A;

FIG. 14A is a sectional view of a rear wheel steer judging means incorporated in the fifth embodiment shown in FIG. 12;

FIG. 14B is a sectional view as viewed in the direction of arrows A—A in FIG. 14A;

FIGS. 20A, 20B and 20C are sectional views similar to FIG. 18, showing the operation of the seventh embodiment;

DESCRIPTION OF THE PREFERRED EMBODIMENTS

Figure 1:
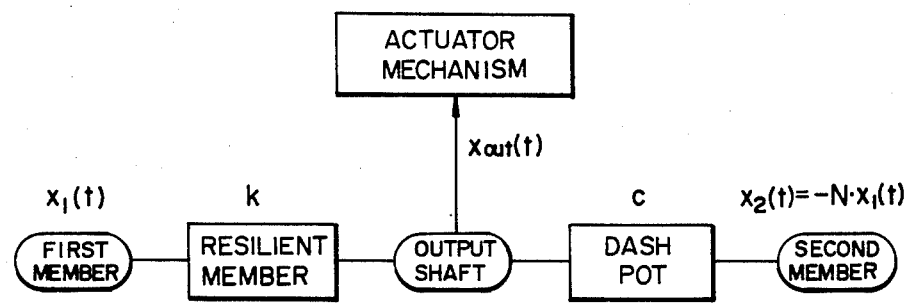
FIG. 1 is a block diagram explanatory of the principle of the invention.
Figure 2:
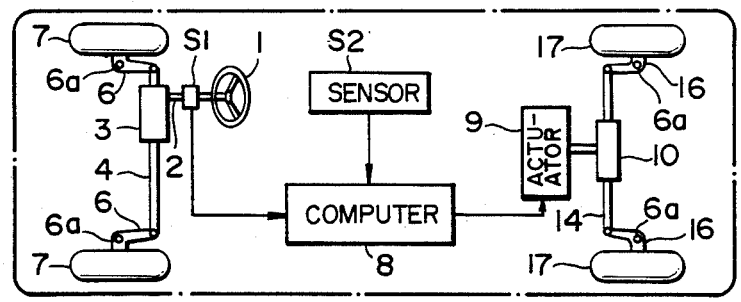
FIG. 2 is a block diagram of a conventional apparatus for controlling the steer angle of rear wheels.

According to the aforementioned first form of the invention, the first member moves in response to the operation of the steering wheel. The movement of the first member may be linear or circular in any of the directions of breadth, length and height of the vehicle. In response to the movement of the first member, the second member moves in the drection counter to the direction of movement of the first member. The output shaft is connected to the first member through a resilient member and also to the second member through a dash pot, so that the output shaft is moved in response to the movement of the first and second members. The movement of the first member, movement of the second member and the movement of the output shaft are expressed by functions of time (t), as $x_1(t)$, $x_2(t)$ and $x_{out}(t)$, respectively. The Fc of the dash pot, which is proportional to the velocity of movement, is expressed by the following formula:

$$Fc = C(\dot{x}_{out}(t) - \dot{x}_2(t)) \qquad (1)$$

where, C represents the damping coefficient of the dash pot, while · represents differentiation by time.

Representing the modulus of elasticity of the resilient member by k, the resetting force Fk of the same member is given by the following formula.

$$Fk = k(x_1(t) - x_{out}(t)) \qquad (2)$$

Since the dash pot resistance Fc is balanced by the resetting force Fk, the condition of the following formula is established.

$$C(\dot{x}_{out}(t) - \dot{x}_2(t)) + k(x_{out}(t) - x_1(t)) = 0 \qquad (3)$$

The condition of the following formula is met because the first and second members move in the counter directions.

$$x_2(t) = -N \cdot x_1(t) \qquad (4)$$

where, N represents a positive proportional constant. The following formula (5) is derived from the conditions of the formulae (3) and (4).

$$x_{out}(t) + \frac{C}{k} \dot{x}_{out}(t) = x_1(t) - \frac{C}{k} \cdot N \cdot \dot{x}_1(t) \qquad (5)$$

The formula (5) can be rewritten in the form of a transfer function $G(s) = x_{out}(s)/x_1(s)$, after a Laplace transformation:

$$G(s) = 1 - \frac{K_1 TS}{1 + TS} \qquad (6)$$

on condition of $K_1 = N+1$ and $T = C/k$, while S represents a complex frequency expressed by $\sigma + j\omega$. The symbol $\sigma$ shows a real number independent from the time t, $\omega$ represents the angular frequency, and j represents $\sqrt{-1}$.

Assuming here that a condition of $K_1 = 2$ is met, i.e., when the displacement of the first member is equal to that of the second member ($x_2(t) = -x_1(t)$), the formula (6) can be rewritten as follows:

$$G(s) = \frac{1 - TS}{1 + TS} \qquad (7)$$

Referring to the formula (7), the condition given by the following formula (8) is met provided that the first and second members move very slowly, i.e., when the complex frequency S approaches "0".

$$\lim_{S \to 0} G(S) = 1 \qquad (8)$$

In this case, therefore, the following condition $x_{out}(s)/x_1(s) = 1$ is met, namely, the output shaft is moved in the same direction and by the same amount as the first member. That is, the condition of $x_{out}(t) = x_1(t)$ is met.

On the other hand, the condition of the following formula (9) is met when the first and second members move quite quickly, i.e., when the complex frequency S approaches the infinite.

$$\lim_{S \to \infty} G(S) = -1 \qquad (9)$$

This means that the condition of $x_{out}(S)/x_1(S) = -1$ is met, i.e., that the output shaft moves in the counter direction to and by the same amount as the movement of the first member and in the same direction and amount as the second member. That is, the condition of $x_{out}(t) = -x_1(t) = x_2(t)$ is met.

The following condition is met when the first and the second members move at a speed intermediate the speeds mentioned above, i.e., when the complex frequency S approximates $1/T$.

$$\lim_{S \to \frac{1}{T}} G(S) = 0 \qquad (10)$$

In this case, since the condition of $x_{out}(S)/x_1(S) = 0$ is met, the outtut shaft is not moved substantially, i.e., $x_{out} \approx 0$, even when the first and the second members are displaced.

Figure 3:
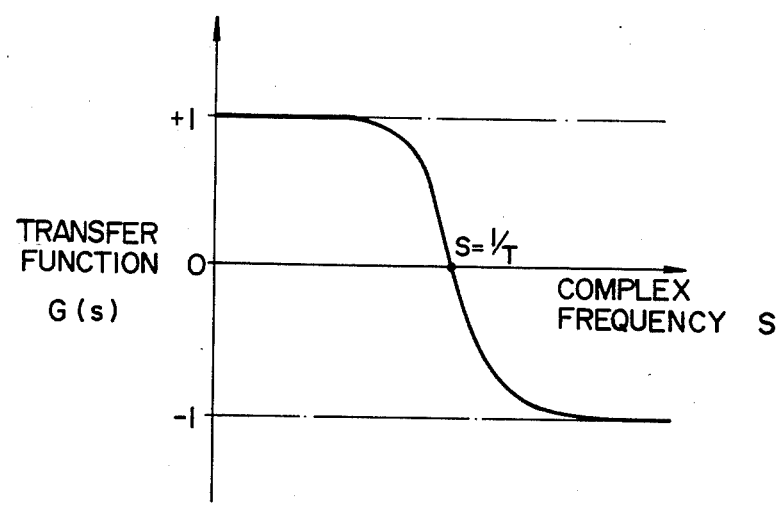
FIG. 3 is a diagram showing the transfer function shown in FIG. 1.

FIG. 3 shows how the complex frequency S is related to the transfer function G(s). It will be seen from this Figure that the output shaft moves in the same direction as the first member when the complex frequency is less than $1/T$, whereas, when the complex frequency S exceeds $1/T$, the output shaft moves in the direction counter to the direction of movement of the first member. The output shaft does not move when the complex frequency equals $1/T$. The travel or distance of movement of the output shaft varies in accordance with the value of the complex frequency.

Since the output shaft is in fact connected to an actuator mechanism which generates rear wheel steer angles, the steer angle of rear wheels changes in accordance with the direction and travel of the output shaft.

As will be understood from the foregoing description, the direction and the distance of movement of the output shaft with respect to the movement of the first and second members are varied in accordance with the value of the complex frequency. More specifically, according to this form of the invention, the first member is moved in response to the operation of the steering wheel and, at the same time, the second member is moved in the direction counter to the direction of movement of the first member, so that the direction of movement of the output shaft is changed in accordance with the speed of operation of the steering wheel, i.e., in accordance with the value of the angular frequency of movement of the steering wheel, whereby when the steering wheel is being operated at high speed, the rear wheel steer angle is generated in the same direction as the steer angle of front wheels, whereas, when the steering wheel is being operated gently, the rear wheel steer angle is formed in the same direction as the front wheels. When the rear wheel steer angle is generated in the direction counter to the front wheels, front wheel steer angle and the rear wheel steer angle are generated substantially concurrently so that the front and rear wheels produce respective forces. These forces in combination produce a yawing moment which tends to turn the vehicle in one direction, thus producing an effect equivalent to that attained by an increase in the steering gain which is the ratio of angle of steer of the steerable wheel to the angular displacement of the steering wheel. Namely, in this case, the effective steer angle of wheels of the vehicle is considered equivalent to the sum of the front wheel steer angle and the rear wheel steer angle, so that the response to the steering input is improved remarkably. Conversely, when the rear wheel steer angle is generated in the same direction as the front wheels, the effective steer angle of the steerable wheels of the vehicle is equivalent to the difference between the steer angles of the front and rear wheels, so that the steering gain is decreased to provide a higher steering stability during straight running of the vehicle.

Another form of the invention is basically the same as the first form but is distinguished from the same by the provision of a variable orifice in the dash pot, a physical amount detecting means for detecting a physical amount relating to the vehicle velocity, and a control means which maximizes and minimizes the cross-sectional area of the orifice when the physical amount is large and small, respectively.

As in the case of the first form of the invention described before, the first member moves in response to the operation of the steering wheel. The movement of the first member may be linear or circular in any of the directions of breadth, length and height of the vehicle. In response to the movement of the first member, the second member moves in the direction counter to the direction of movement of the first member. The output shaft is connected to the first member through a resilient member and also to the second member through the dash pot having the variable orifice, so that the output shaft is moved in response to the movement of the first and second members. The physical amount detecting means detects a physical amount relating to the vehicle velocity, e.g., the value of the vehicle velocity itself, yaw rate, etc., and the control means operate such as to maximize and minimize the cross-sectional area of the variable orifice when the physical amount is large and small, respectively, thereby minimizing and maximizing the damping effect of the dash pot.

As in the case of the first form, the transfer function $G(S)$, which is the ratio between the output $x_{out}(S)$ after Laplace transformation to the input $x_1(S)$ after Laplace transformation is given by the formula (7) mentioned before. Therefore, if the cross-sectional area of the variable orifice is suitably selected to provide the damping coefficient C equal to that in the first form, while employing the same time constant $T=C/k$ as the first form, the same effect as that produced by the first form is obtained. Namely, when the first and the second members move very slowly, the output shaft moves in the same direction as the first member, whereas, when the first and second members are moved very quickly, the output shaft is moved in the direction counter to the direction of movement of the first member. When the first and the second members move at a medium speed, the output shaft is not moved substantially.

Therefore, according to the invention, the first member is moved in response to the operation of the steering wheel, while the second member is moved in the direction counter to the direction of movement of the first member, thus changing the direction of movement of the output shaft in accordance with the speed of operation of the steering wheel, i.e., the value of the angular frequency of movement of the steering wheel, whereby when the steering wheel is being operated at high speed, the rear wheel steer angle is generated in the same direction as the steer angle of front wheels, whereas, when the steering wheel is being operated gently, the rear wheel steer angle is formed in the same direction as the front wheels. When the rear wheel steer angle is generated in the direction counter to the front wheels, front wheel steer angle and the rear wheel steer angle are generated substantially concurrently so that the front and rear wheels produce respective forces. These forces in combination produce a yawing moment which tends to turn the vehicle in one direction, thus producing an effect equivalent to that attained by an increase in the steering gain which is the ratio of angle of steer of the steerable wheel to the angular displacement of the steering wheel. Namely, in this case, the effective steer angle of wheels of the vehicle is considered equivalent to the sum of the front wheel steer angle and the rear wheel steer angle, so that the response to the steering input is improved remarkably. Conversely, when the rear wheel steer angle is generated in the same direction as the front wheels, the effective steer angle of the steerable wheels of the vehicle is equivalent to the difference between the steer angles of the front and rear wheels, so that the steering gain is decreased to provide a higher steering stability during straight running of the vehicle.

In this another form of the invention, when the physical amount relating to the vehicle speed is large, the cross-sectional area of the variable orifice in the dash pot is maximized such as to minimize the damping coefficient and, hence, the damping power of the dash pot. In consequence, the damping force of the dash pot becomes sufficiently smaller than the resetting force produced by the resilient member, so that the movement of the output shaft is ruled mainly by the resetting force of the resilient member. Since the output shaft is connected to the first member through the resilient member, the output shaft is moved in the same direction as the first member regardless of the speed of operation of the steering wheel. Thus, the output shaft is moved in the same direction as the first member irrespective of the speed of operation of the steering wheel, when the cross-sectional area of the variable orifice is maximized. Making an effective use of this fact, the present form of the invention allows the rear wheel steer angle to be formed in the same direction as the front wheel steer angle through the maximization of the cross-sectional area of the variable orifice, whenever the physical amount relating to the vehicle speed is large, e.g., when the vehicle is running at a high speed.

Conversely, when the physical amount relating to the vehicle speed is small, the cross-sectional area of the variable orifice is minimized to maximize the damping coefficient and, hence, the attenuation force of the dash pot. As a result, the attenuation force of the dash pot is made sufficiently larger than the resetting force of the resilient member, so that the movement of the output shaft is ruled mainly by the damping force of the dash pot. Since the output shaft is connected to the first member through the resilient member, the output shaft is moved in the direction counter to the direction of movement of the first member, i.e., in the same direction as the second member, regardless of the speed of operation of the steering wheel. Thus, the output shaft is moved in the direction counter to the direction of movement of the first member irrespective of the speed of operation of the steering wheel, when the cross-sectional area of the variable orifice is minimized. Making an effective use of this fact, the present form of the invention allows the rear wheel steer angle to be formed in the direction counter to the front wheel steer angle through the minimization of the cross-sectional area of the variable orifice, whenever the physical amount relating to the vehicle speed is small, e.g., when the vehicle is running at a low speed.

According to yet another form of the invention, there is provided an apparatus for controlling steer angle of rear wheels of a vehicle in response to the operation of the steering wheel for generating the steer angle of front wheels of the vehicle, the apparatus comprising, further to the first form of the invention, between the rear wheels and the controlling means, an actuator means including a cylinder through which is extended a linkage connected to the rear wheels, a piston which divides the space in the cylinder into two chambers, a hydraulic pressure generator adapted to be driven by the engine of the vehicle such as to generate a hydraulic pressure, and a control valve adapted to be operated by the output shaft of the control means such as to bring the hydraulic pressure generator selectively to one of the chambers in the cylinder.

Thus, in this third form of the invention, the control means operates, upon judging the speed of operation of the steering wheel, to switch the flow passage in the control valve of the actuator such that the rear wheel steer angle is generated in the direction counter to the front wheels and in the same direction as the front wheels, respectively, when the steering wheel is being operated quickly and gently. In consequence, the hydraulic pressure generated in the hydraulic pressure generator driven by the engine is supplied to and discharged from two chambers in the piston, respectively. The two chambers in the cylinder are separated from each other by the piston to which is fixed the linkage which in turn is connected to the rear wheels. Therefore, the rear wheels are steered by the linkage which is moved by the movement of the piston caused by the pressure differential across the piston. When the rear wheel steer angle is generated in the direction counter to the front wheels, front wheel steer angle and the rear wheel steer angle are generated substantially concurrently so that the front and rear wheels produce respective forces. These forces in combination produce a yawing moment which tends to turn the vehicle in one direction, thus producing an effect equivalent to that attained by an increase in the steering gain which is the ratio of angle of steer of the steerable wheel to the angular displacement of the steering wheel. Namely, in this case, the effective steer angle of wheels of the vehicle is considered equivalent to the sum of the front wheel steer angle and the rear wheel steer angle, so that the response to the steering input is improved remarkably. Conversely, when the rear wheel steer angle is generated in the same direction as the front wheels, the effective steer angle of the steerable wheels of the vehicle is equivalent to the difference between the steer angles of the front and rear wheels, so that the steering gain is decreased to provide a higher steering stability during straight running of the vehicle.

Figure 4:
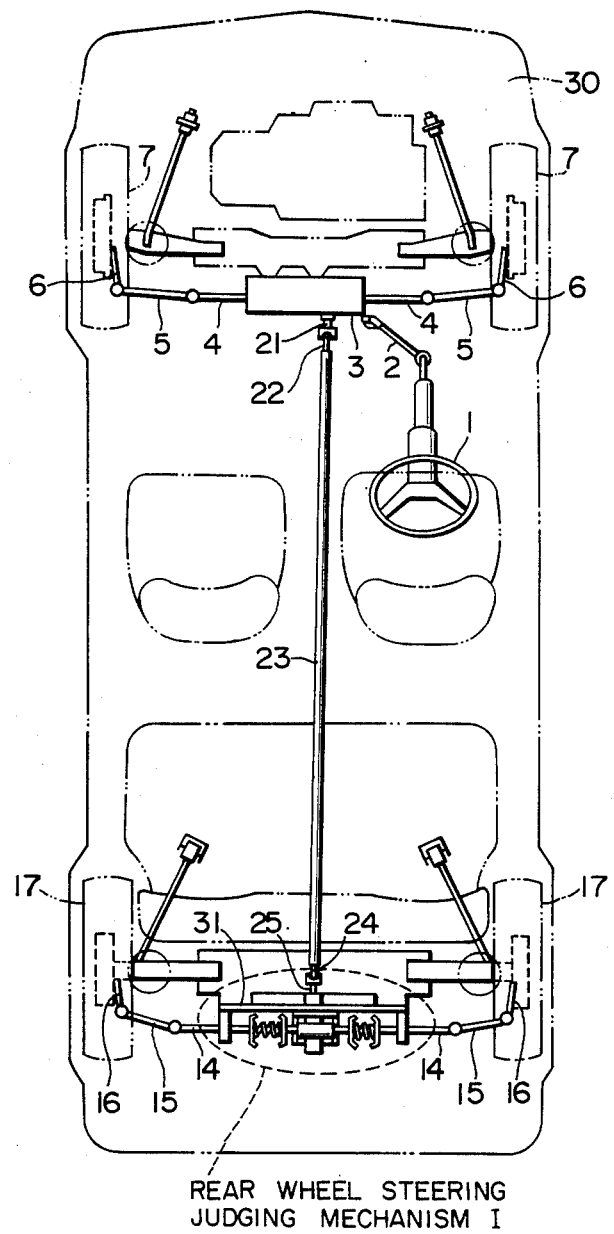
FIG. 4 is a schematic plan view of a 4-wheel steering vehicle incorporating a first embodiment of the rear wheel steer angle controlling apparatus of the invention.
Figure 5A:
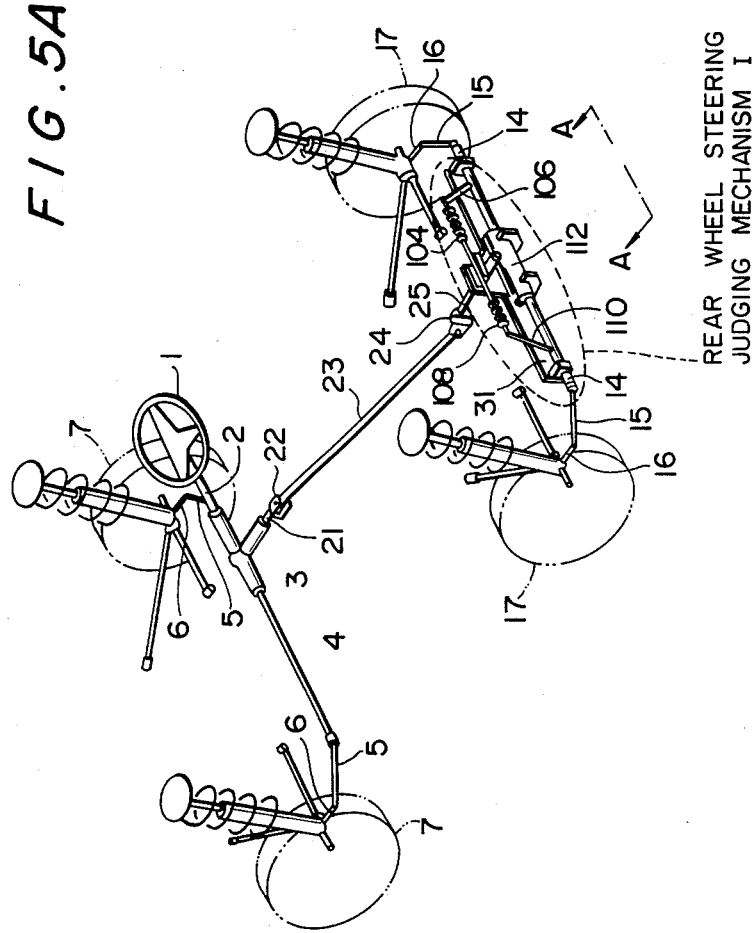
FIG. 5A is a schematic perspective view of a 4-wheel steering vehicle incorporating the first embodiment of the rear wheel steer angle controlling apparatus of the invention.

The invention will be more fully understood from the following description of the preferred embodiments. FIG. 4 is a plan view of a 4-wheel steering vehicle equipped with a first embodiment of the rear wheel steer angle controlling apparatus of the invention, while FIG. 5A is a perspective view of the same.

Referring to these Figures, a steering wheel 1 is connected to a gear box 3 through a shaft 2. To both ends of the gear box 3 are connected linkages 4 each of which is connected to a tie rod 5. Knuckle arms 6 are connected to respective tie rods 5 for rotation about pivot shafts. Pivot shafts carried by the other ends of the knuckle arms 6 carry front wheels 7 of a vehicle for rotation thereabout.

Rear wheels 17 of the vehicle are connected to both ends of the steering mechanism which includes the knuckle arms 16, tie rods 15 and the linkages 14, as in the case of the front wheels 7.

The gear box 3 accommodates a motion converting mechanism which is constituted by a pinion (not shown) connected to the shaft 2, another pinion (not shown) meshing with the first-mentioned pinion and fixed to a connection shaft 21, and a rack which is fixed to the linkage 4 and meshing with the pinion connected to the shaft 2. The connecting shaft 21 is coupled to an operation shaft 23 through a universal joint 22. Therefore, the rotation of the steering wheel is converted into the rotation of the operation shaft 23 through the gear box 3. The direction of rotation of the operation shaft 23 is counter to the direction of rotation of the steering wheel 1. The rotation of the operation shaft 23 is converted into linear motion of the linkages 4 which in turn steer the front wheels 7 of the vehicle.

The operation shaft 23 has an end connected to an input shaft 25 of a rear wheel steering judging mechanism I, through a universal joint 24. An operation mechanism constituted by the linkage 14, tie rod 15 and the knuckle arm 16 is connected to each end of the rear wheel steering judging mechanism I. The rear wheels of the vehicle are connected to respective knuckle arms 16. This mechanism is substantially the same as the front wheel steering mechanism constituted by the linkage 4, tie rod 5 and the knuckle arm 6.

The details of the rear wheel steering judging mechanism I will be explained hereinunder with specific reference to FIGS. 5A and 5B. The input shaft 25 of the rear wheel steering judging means I has a pinion 25A formed on one end thereof and is rotatably carried through a bearing on a bracket 31 provided on a chassis 30 (see FIG. 4). A rod 102 which serves as a first member and a rack 111 which serves as a second member are arranged in symmetry with each other with respect to the input shaft 25. The rod 102 has a rack 101 which meshes with the pinion 25A on the input shaft 25. The rack 111 also meshes with the pinion 25A on the input shaft 25. More specifically, the rack 101 is integrated with the rod 102 which is carried for movement to the left and right with respect to the bracket 31, i.e., in the breadthwise direction of the chassis 30. The rack 111 is integrated with a cylinder 112 which is charged with a working oil of a suitable viscosity. The cylinder 112 is moved to the left and right with respect to the bracket 31, i.e., in the breadthwise direction of the chassis 30. The cylinder 112 accommodates a piston 113 which is provided with an orifice 114. The piston 113 divides the space in the cylinder into two chambers 116L and 116R. To the piston 113, is connected an output shaft which extends in the breadthwise direction of the chassis 30 through the cylinder 112. The output shaft serves as the linkage 14. Both ends of the output shaft or linkage 14 are movably supported by the bracket 31. The cylinder 112, working oil 115 and the piston 113 with the orifice 114 in combination constitute an oil damper which serves as the dash pot.

To respective output ends of the linkage 14 are connected integrally connecting rods 106 and 110 which carry at their other ends spring seats 105 and 109 integrally attached thereto. On the other hand, spring seats 103 and 107 are integrally attached to respective ends of the rod 102. Coiled springs 104 and 108 are loaded between the spring seats 103, 107 and 105, 109 as illustrated.

The operation of the rear wheel steering judging mechanism I, as well as the operation of the first embodiment, will be explained hereinunder.

For the purpose of simplification of the explanation, the following description is made on an assumption that the front wheels 7 have been steered to the right by a clockwise rotation of the steering wheel 1 by an angle $\delta h(t)$ which is a function of the time (t).

When the steering wheel 1 is in the central or neutral position, i.e., when the vehicle is running straight, the rear wheel steering judging mechanism I is in symmetry with respect to the vertical neutral axis (shown by one-dot-and-dash line) (A) the input shaft 25.

A rotation of the steering wheel 1 causes a rotation of the connecting shaft 21 through the motion converting mechanism in the gear box. The rotation of the connecting shaft 21 is transmitted to the input shaft 25 through the universal joint, operation shaft 23 and the universal joint 24. The motion converting mechanism in the gear box 3 is arranged such that the clockwise rotation of the steering wheel 1 by an angle δh(t) causes a counter-clockwise rotation of the input shaft 25 by an angle θin(t).

The counter-clockwise rotation of the input shaft 25 and, hence, of the pinion causes the rack 101 to move to the left so that the rod 102 carrying the rack 101 also is moved to the left. On the other hand, the rack 111 is moved to the right, thus causing the cylinder 112 to move to the right. The travel or distance of movement of the rod 102 and the cylinder 112 is proportional to the rotation angle θin(t) of the input shaft 25, regardless of the speed of operation of the steering wheel.

The leftward movement of the rod 102 causes resilient deformation of the coiled springs 108 and 104, so that these springs produce resetting forces which act through the connecting rods 110, 106 on the linkage 14 to move the latter to the left. On the other hand, the rightward movement of the cylinder 112 causes the volumes of the left damper chamber 116L and the right damper chamber 116R to be changed, thus generating an oil pressure which tends to drive the piston 113 to the right. In consequence, the linkage 14, which is constituted by the piston rod connected to the piston 113, is moved to the right. As a result, the working oil 115 flows from the left damper chamber 116L to the right damper chamber 116R through the orifice 114. The working oil flowing through the orifice encounters a resistance due to its viscosity, thus producing a damping force. The damping force and, hence, the rate of transmission of the force from the cylinder 112 to the piston 113, is changed in accordance with the velocity of movement of the cylinder 112, i.e., the speed of operation of the steering wheel.

As will be seen from FIG. 6B, when the speed of rotation of the input shaft 25 is low, i.e., when the steering wheel is being rotated slowly, the working oil 115 can pass through the orifice 114 without substantial resistance, so that the cylinder 112 can move without transmitting any substantial force to the piston 13, so that the linkage 14 is moved mainly by the resetting forces of the coiled springs 108, 104 to the left by an amount which is substantially equal to the leftward stroking of the rod 102.

Referring now to FIG. 6C, when the input shaft 25 rotates at a high speed, i.e., when the steering wheel is being rotated at a high speed, the working oil 115 encounters a large flow resistance produced by the viscosity of the oil, so that the force transmitted from the cylinder 112 to the piston 113 (this force is referred to as "damping force" hereinunder for convenience sake) is increased beyond the resetting force produced by the coiled springs 108, 104. As a result, the coiled spring 108 is compressed to reduce its length while the coiled spring 104 is allowed to expand, so that the linkage 14 is moved to the right by an amount which is substantially equal to the rightward stroking of the cylinder 112.

The linear movement of the linkage 14 to the left and right, i.e., in the breadthwise direction of the chassis, is transmitted through the tie rods 15 to the knuckle arms 16 such as to rotate the knuckle arms 16, thereby generating steer angle of the rear wheels 17.

More specifically, as will be seen from FIG. 6D, the leftward linear movement of the linkage 14 produces the rear wheel steer angle in the clockwise direction, while the rightward linear movement of the linkage 14 produces the rear wheel steer angle in the counter-clockwise direction.

As will be understood from the foregoing description, this embodiment of the invention produces an effect that the rear wheel steer angle is generated in different directions depending on the speed of operation of the steering wheel, even when the direction of rotation of the steering wheel is the same. Namely, when the steering wheel is being rotated clockwise, for example, thus steering the front wheels to the right, if the speed of operation of the steering wheel is low, the linkage 14 is moved in the same direction and by the same amount as the leftward movement of the rack 101 such as to generate the rear wheel steer angle in the rightward direction. However, if the speed of operation of the steering wheel 1 is high, the linkage 14 moves in the same direction and by the same amount as the rightward movement of the rack 111, so that the rear wheel steer angle is generated in the leftward direction. Similarly, when the steering wheel is rotated counter-clockwise, the rear wheel steer angle is generated in the leftward and rightward directions, respectively, when the speed of operation of the steering wheel is low and high.

When the steering wheel 1 and, hence, the input shaft 25 are being rotated at a medium speed, the damping force produced by the oil damper constituted by the cylinder 112 and the piston 113 is materially balanced by the resetting force of the coiled springs 108, 104, so that the linkage 14 is not moved substantially. In consequence, no substantial steer angle is generated for the rear wheels.

Whether the speed of rotation of the steering wheel 1 is high or low is judged on the basis of the time constant T which is the ratio C/k between the damping coefficient C (kg sec/m) of the oil damper constituted by the cylinder 112 and the piston 113 and the spring constant k (kg/m) of a spring which is equivalent to the combination of the springs 108, 104. As shown in the formula (7), as well as in FIG. 1, the value of this time constant T corresponds to that of the time constant which causes an inversion of the rear wheel steering direction with respect to the steering direction of the front wheels, i.e., the time consant at which a phase delay of 90° is formed between the formation of the front wheel steer angle and the formation of the rear wheel steer angle.

The steering gain which is the ratio of the magnitude of the rear wheel steer angle to the angular displacement of the steering wheel is determined by two factors: namely, the ratio of angle of rotation of the input shaft 25 to the angular displacement of the steering wheel and the ratio of the number of gear teeth of the racks 101, 111 to the number of teeth of the pinion on the input shaft 25.

As has been described, according to this embodiment of the invention, rear wheel steer angle proportional to the steer angle of front wheels is generated in the same direction as the direction of steer of the front wheels when the steering wheel is being operated slowly and in the direction counter to the direction of steer of the front wheels when the steering wheel is being rotated quickly, whereas, when the steering wheel is being rotated at a medium speed, the angle of steer of rear wheels is substantially zero so that the rear wheels are not steered substantially.

It is thus possible to control the magnitude and the direction of steer of the rear wheels in accordance with the speed of operation of the steering wheels, by producing steering force acting on the rear wheels corresponding to the speed of operation of the steering wheel. When the steering wheel is being rotated quickly, the rear wheels are steered in the direction counter to the direction of steer of the front wheels, so that the effective steer angle of wheels in response to a given steering input is increased equivalently to the sum of the steer angles of the front and rear wheels, thereby enhancing the turning of the vehicle in response to the steering input for turning the vehicle. Conversely, when the speed of operation of the steering wheel is low, the rear wheels are steered in the same direction as the front wheels, so that the effective steering angle of wheels is decreased equivalently to the difference of the steer angle between the front and rear wheels, so that the response of the vehicle to the turning input is decreased to ensure a higher running stability of the vehicle during running straight.

It is to be understood also that the above-described advantageous effects are produced by a comparatively simple mechanism which is composed mainly of a conversion mechanism, coiled springs and oil damper. It is quite advantageous that the magnitude and direction of the rear wheel steer angle are controlled by this mechanism which is strong in construction and stable and reliable in operation.

It is to be noted also that, since the direction and magnitude of the rear wheel steer angle are determined upon judging the speed of rotation of the steering wheel through detection of rotation of the input shaft which rotates in response to the steering operation of the steering wheel, the apparatus need not be equipped with either a separate device for detecting the rotation speed of the steering wheel or a separate device for detecting the rotation angle of the same simultaneously. This is quite convenient from the view point of ease of mounting of the apparatus on a vehicle.

The rear wheel steering judging mechanism incorporated in the embodiment described hereinbefore has not only the mechanism for judging the speed of operation of the steering wheel but also a mechanism for actually steering the rear wheel in accordance with the result of judgement. If the rear wheel steering judging mechanism is required to exert a power which is large enough to overcome the reactional force exerted by the road surface on the rear wheels during steering of the rear wheel, the damper and the coiled springs should be selected such that both the damping coefficient C and the equivalent spring constant k have large values, while keeping the value of the ratio C/k constant. This in turn may require a large manual power for the steering of the rear wheels. In such a case, it is advisable to provide a power steering device in the gear box 3, in order to assist the manual steering power.

A second embodiment of the invention, having a different rear wheel steering judging mechanism from that of the first embodiment, will be described hereinunder with reference to FIGS. 7A and 7B.

More specifically, the rear wheel steering judging mechanism of this embodiment is distinguished from that in the first embodiment by the construction of the damper. Namely, in the second embodiment, the cylinder of the damper is provided with a by-pass conduit the sectional area of which is adjustable by means of a rotatable control valve, thus allowing control of the speed of the piston.

The second embodiment, in particular the feature peculiar to this embodiment, will be described with reference to FIGS. 7A and 7B in which the same reference numerals are used to denote the same parts or members as those in the first embodiment.

Figure 7B:
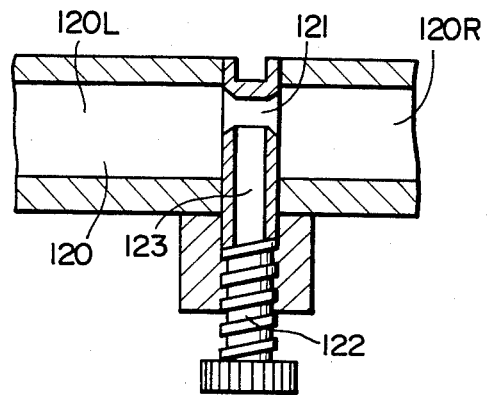
FIG. 7B is an enlarged view of the portion "A" shown in FIG. 7A.

As shown in FIG. 7A, a cylinder 112a is provided with a by-pass conduit 120 which provides a communication between a left damper chamber 116L and a right damper chamber 116R. A piston 113a accommodated by the cylinder 112a has no orifice, unlike the piston used in the first embodiment. A control valve 123 which is provided in the substantially mid portion of the by-pass conduit 120 is movable into and out of the conduit 120 perpendicularly thereto. The portions of the by-pass conduit 120 on the right and left sides of the control valve 123 will be referred to as right by-pass conduit section 120R and left by-pass conduit section 120L, respectively. As will be clearly seen from FIG. 7B which is an enlarged view, an adjusting screw 122 for moving the control valve 123 into and out of the by-pass conduit 120 is connected to the control valve 123 integrally therewith. The space between the inner end of the control valve 123 and the inner surface of the by-pass conduit 120 constitutes an orifice 121.

Therefore, according to the second embodiment of the invention, the size of the orifice 121 and, hence, the speed of movement of the piston 113a can be adjusted by moving the control valve 123 up and down, through rotation of the adjusting screw 122. Thus, the damping force of the damper is adjustable through adjustment of the orifice 121. For instance, if the orifice 121 is fully opened, the damping force of the damper is decreased so that the linkage 14 is moved in the same direction as the rack 101 substantially solely by the resetting force of the coiled springs 108, 104, regardless of the speed of rotation of the input shaft 25. This means that the rear wheels are steered in the same direction as the front wheels, irrespective of the speed of rotation of the steering wheel.

On the other hand, when the orifice 121 is fully closed, the damping force of the damper is maximized to exceed the resetting force of the coiled springs, so that the linkage 14 is moved in the same direction as the rack 111 substantially solely by the damping force of the damper. This means that the rear wheels are steered in the direction counter to the steering direction of the front wheels, regardless of the speed of the steering wheel.

As has been described, according to this embodiment of the invention, the level of judgement of the speed of steering wheel can be varied by changing the damping force of the damper through adjustment of the orifice. It is thus possible to optimize or suitably determine the rear wheel steering characteristics, i.e., the steer angle and direction of rear wheels in relation to the steering input.

Figure 8B:
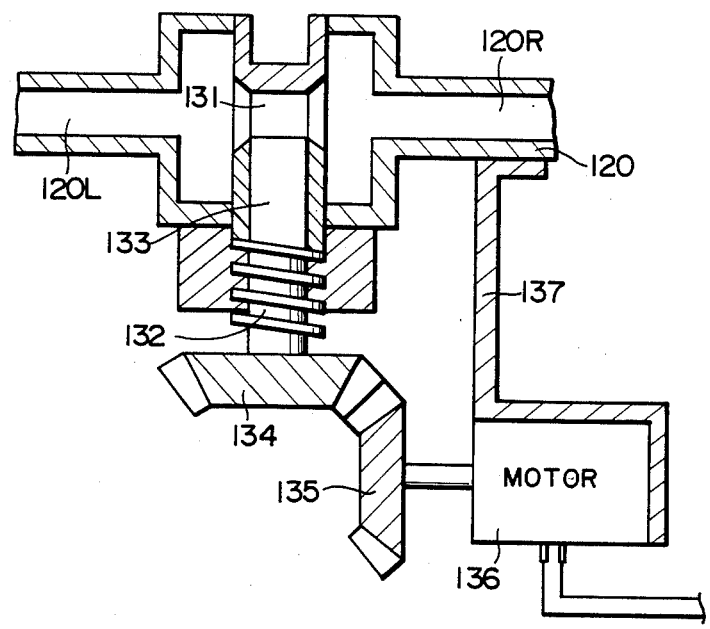
FIG. 8B is an enlarged view of a portion "B" shown in FIG. 8A.
Figure 8A:
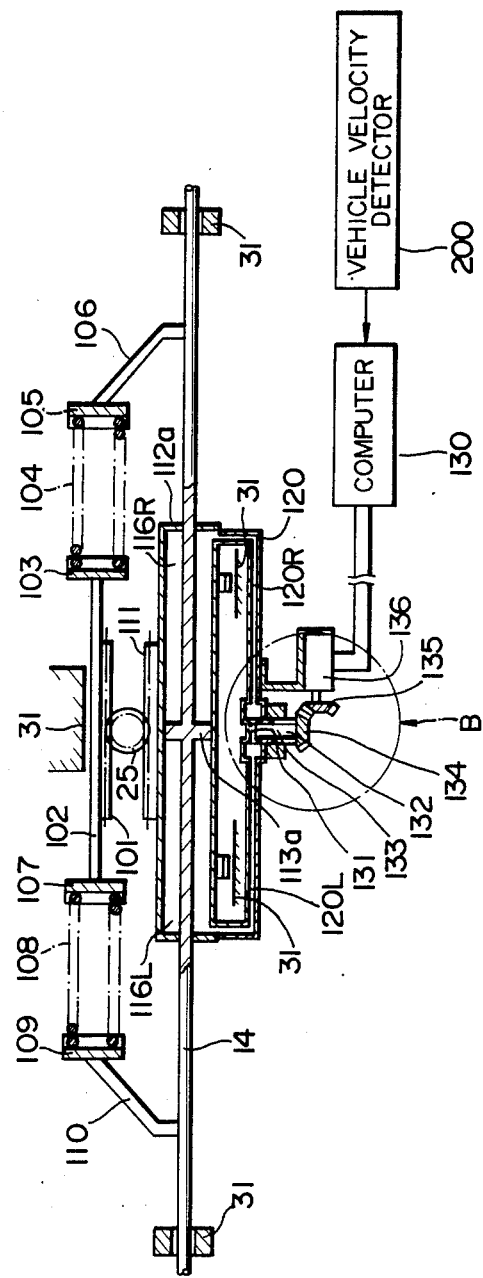
FIG. 8A is a sectional view of a third embodiment, showing in particular the portion corresponding to the portion of the first embodiment shown in FIG. 5B.

A third embodiment of the invention, which incorporates still another rear wheel steering judging mechanism, will be described hereinunder. Referring to FIG. 8A, there is shown a rear wheel steering judging mechanism used in the third embodiment, together with a control means for controlling the cross-sectional area of the orifice in the rear wheel steering judging mechanism and a vehicle velocity detector which detects the vehicle velocity as the physical amount relating to the vehicle speed. FIG. 8B is an enlarged view of the portion marked "B" in FIG. 8A. Other portions of this embodiment are materially identical to those of the first embodiment and, therefore, are not described in detail.

The rear wheel steering judging mechanism used in this embodiment is basically the same as that used in the second embodiment but is distinguished therefrom in that the cross-sectional area is automatically adjusted in accordance with the vehicle speed. The following description, therefore, will be focussed mainly on the feature which discriminates the third embodiment from the second embodiment.

Figure 9A:
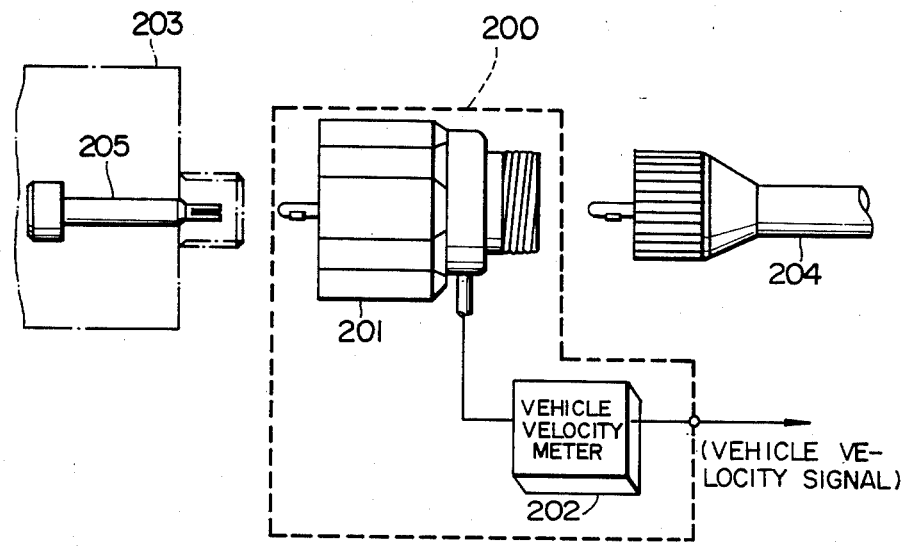
FIG. 9A shows the detail of the vehicle speed detector.
Figure 9B:
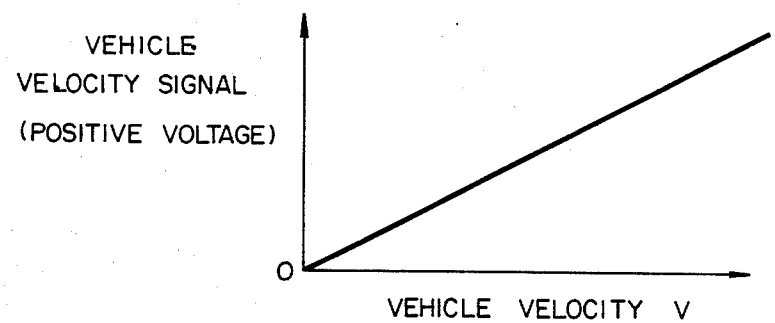
FIG. 9B is a diagram showing vehicle speed.

As shown in FIG. 8B, a control valve 133 for adjusting the size or the cross-sectional area of the passage in the orifice 131 has an adjusting screw 132 integrally connected thereto. The adjusting screw 132 is adapted to rotate as a unit with a bevel gear 134 which meshes with another bevel gear 135. Thus, the bevel gears 134 and 135 in combination constitute a pair of miter gears. The bevel gear 135 is fixed to a shaft of a motor 136 such as to be rotated by the motor 136. The motor 136, which is of a reversible type, is mounted on the outer surface of the by-pass conduit 120 by means of a retainer 137, such as to be movable to the left and right together with the cylinder 112a, and is electrically connected to a microcomputer 130 on the vehicle such as to be controlled by the microcomputer 130. A vehicle velocity detector 200 connected to the microcomputer 130 is constituted by a generator 201 and a vehicle velocity meter 202 as shown in FIG. 9A. The generator 201 is mounted on a portion of the transmission case 203 (transmission extension housing) near the receptacle for a speed meter cable 204, and is connected between a speed meter driven gear 205 in the transmission case adapted for rotation at a speed corresponding to the vehicle velocity or speed and the speed meter cable 204 which transmits the rotation speed of the gear 205 to a speed meter. The generator 201, therefore, generates an A.C. voltage corresponding to the rotation speed which in turn represents the vehicle velocity. The vehicle velocity meter 202 has a function for reducing the A.C. voltage when this voltage is too high and to conduct a full-wave rectification of the A.C. voltage thereby producing a ripple voltage which is smoothed by a filter to become a D.C. voltage signal as shown in FIG. 9B. The generator 201 delivers this D.C. voltage signal representing the vehicle velocity to the microcomputer 130.

Upon receipt of the vehicle velocity signal, the microcomputer 130 judges the vehicle speed and controls the motor 136 in such a manner that, when the vehicle speed is low, the control valve 133 is fully closed to minimize the cross-sectional area of the orifice 131, whereas, when the vehicle speed is high, the control valve 133 is fully opened to maximize the cross-sectional area of the orifice 131. Thus, the motor 136 operates in accordance with the control signal issued from the microcomputer 130 such as to drive the adjusting screw 132 and, hence, the control valve 133 through the miter gear constituted by the pair of bevel gears 134 and 135. In this embodiment, therefore, it is possible to automatically control the cross-sectional area of the orifice and, therefore, the damping force of the oil damper in accordance with the vehicle speed.

More specifically, the angle of steer of the rear wheels is changed as follows by the operation of the motor 136 which in turn is under the control of the control signal issued from the microcomputer 130.

When the vehicle speed is low, the microcomputer 130 provides a control signal such as to fully close the orifice 131. Upon receipt of this control signal, the motor 136 operates to close the control valve, so that the damping force of the damper is increased beyond the resetting force of the coiled springs 108, 104. In this case, the movement of the linkage 14 is ruled almost solely by the damping force of the damper. Therefore, the linkage 14 is moved in the same direction as the movement of the rack 111, so that the rear wheels are steered in the direction counter to the direction of steer of the front wheels, regardless of the speed of operation of the steering wheel, whenever the vehicle speed is low.

In contrast, when the vehicle speed is high, the microcomputer 130 delivers to the motor 136 such as to fully open the orifice 131. In this case, the damping force of the damper is much smaller than the resetting force of the springs 108, 104, so that the movement of the linkage 114 is ruled almost solely by the resetting force of these springs 108, 104. In consequence, the linkage 14 moves in the same direction as the movement of the rack 101, so that the rear wheels are steered in the same direction as the front wheels irrespective of the speed of operation of the steering wheel, whenever the vehicle is running at high velocity.

As will be understood from the foregoing description, according to the third embodiment of the invention, the rear wheel steer angle is formed in the direction counter to the direction of steer of the front wheels when the vehicle is running at low speed, thus improving the turning performance of the vehicle, whereas, when the vehicle is running at high speed, the rear wheels are steered in the same direction as the front wheels thus avoiding any drastic increase in the turning sensitivity of the vehicle, thereby assuring a high steering stability. In addition, when the vehicle is running at a medium speed, the direction of steer of the rear wheels is controlled in accordance with the speed of operation of the steering wheel, such that the steering gain is increased to improve the response to the steering input for turning the vehicle when the steering wheel is being operated quickly, whereas, when the steering wheel is being operated slowly, the steering gain is decreased to prevent yaw and fluctuation of the vehicle thereby attaining a high running stability during straight running of the vehicle.

Figure 10A:
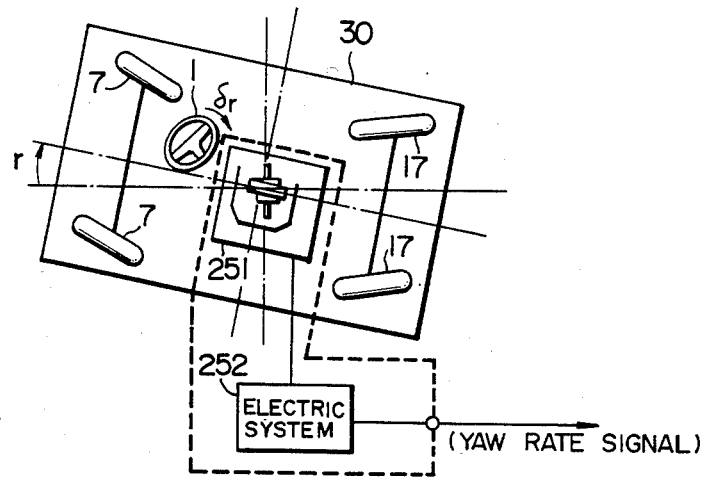
FIG. 10A is a view showing the detail of a yaw detector.
Figure 10B:
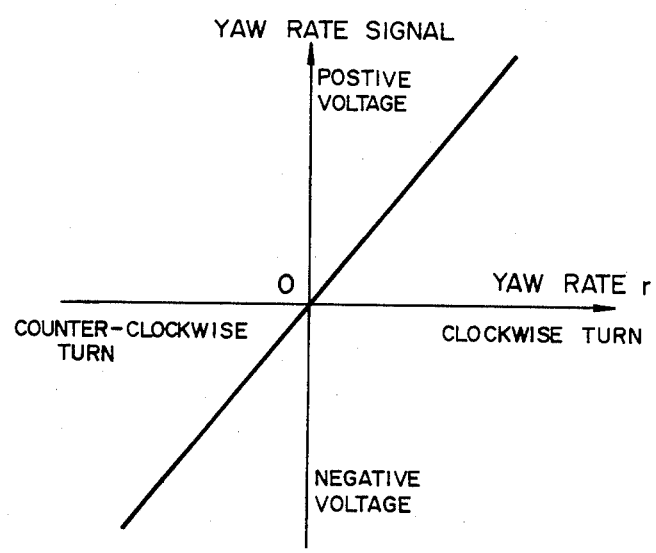
FIG. 10B is a diagram showing a yaw rate signal.

A steering operation during running at high speed causes a large yaw rate, as well as a large lateral acceleration. It is, therefore, possible to control the cross-sectional area of the orifice by making use of the yaw rate or the lateral acceleration as the physical amount relating to the vehicle speed, in place of the vehicle velocity explained before. FIG. 10A shows an example of a yaw rate detector which is used for the purpose of detection of the yaw rate. As will be seen from this Figure, the yaw rate detector is composed of a rate gyro 251 and an electric system 252. The rate gyro 251 is fixed to the chassis 30 at a position of centroid of the latter and is designed for detecting the yaw rate r which is the angular velocity of the vehicle body 30 about a vertical axis. The electric system 252 is adapted to supply a voltage to the rate gyro 251 and to produce a yaw rate signal by amplifying the signal from the rate gyro 251. The yaw rate signal is delivered to the microcomputer 130 as shown in FIG. 8A. The rate gyro 251 and the electric system 252 are arranged such that the yaw rate signal takes a positive value when the yaw rate r is produced by clockwise yaw of the vehicle about a vertical axis in response to clockwise rotation of the steering wheel 1, and a negative value when the yaw rate r is produced by counter-clockwise yaw of the vehicle about the vertical axis in response to counter-clockwise rotation of the steering wheel 1, as shown in FIG. 10B. The microcomputer 130 operates to maximize and minimize the cross-sectional area of the orifice when the absolute value of the yaw rate signal is large and small, respectively, whereby the steer angle of the rear wheel is controlled as in the case of the second embodiment.

A fourth embodiment of the invention having a different rear wheel steering judging mechanism will be described hereinunder with reference to FIGS. 11A and 11B.

The rear wheel steering judging mechanism in the fourth embodiment is basically the same as that in the first embodiment, except that the coiled springs are mounted in a manner different from that in the first embodiment.

More specifically, as shown in FIG. 11A, the coiled springs 108 and 104 are held at their one ends by spring seats 107a, 103a which are integrally connected to the linkage 14 constituted by the piston rod of the piston 113 of the damper and at their other ends by spring seats 109a, 105a which are integrally fixed to the rod 102. As will be seen from FIG. 11B which shows the portion around the spring 104 in a larger scale, the spring seats 105a, 109a integrally connected to the connecting rods 106a, 110a have central bores through which the linkage 14 extend, so that the movement of the linkage 14 is not interfered by the spring seats 105a, 109a.

The described rear wheel steering judging mechanism of this embodiment produces the same advantages as those produced by the rear wheel steering judging mechanism incorporated in the first embodiment.

Namely, in this fourth embodiment, the rear wheel steer judging mechanism judges the speed of operation of the steering wheel from the rotation of the input shaft which rotates in response to the operation of the steering wheel, and determines the direction and angle of steer of the rear wheels such that, when the steering wheel is being operated quickly, the rear wheels are steered in the direction counter to the direction of steer of the front wheels thereby improving the response of the vehicle to the steering input for turning the vehicle, whereas, when the steering wheel is being operated slowly, the rear wheels are steered in the same direction as the front wheels such as to improve the running stability of the vehicle.

In addition, this fourth embodiment produces an effect peculiar thereto in that the coiled springs are prevented from coming off even when the distance between both spring seats is accidentally increased beyond the free length of the coiled spring, although such an accident does not occur normally.

An explanation will be made hereinunder as to a fifth embodiment of the invention having another type of rear wheel steering judging mechanism II.

Figure 12:
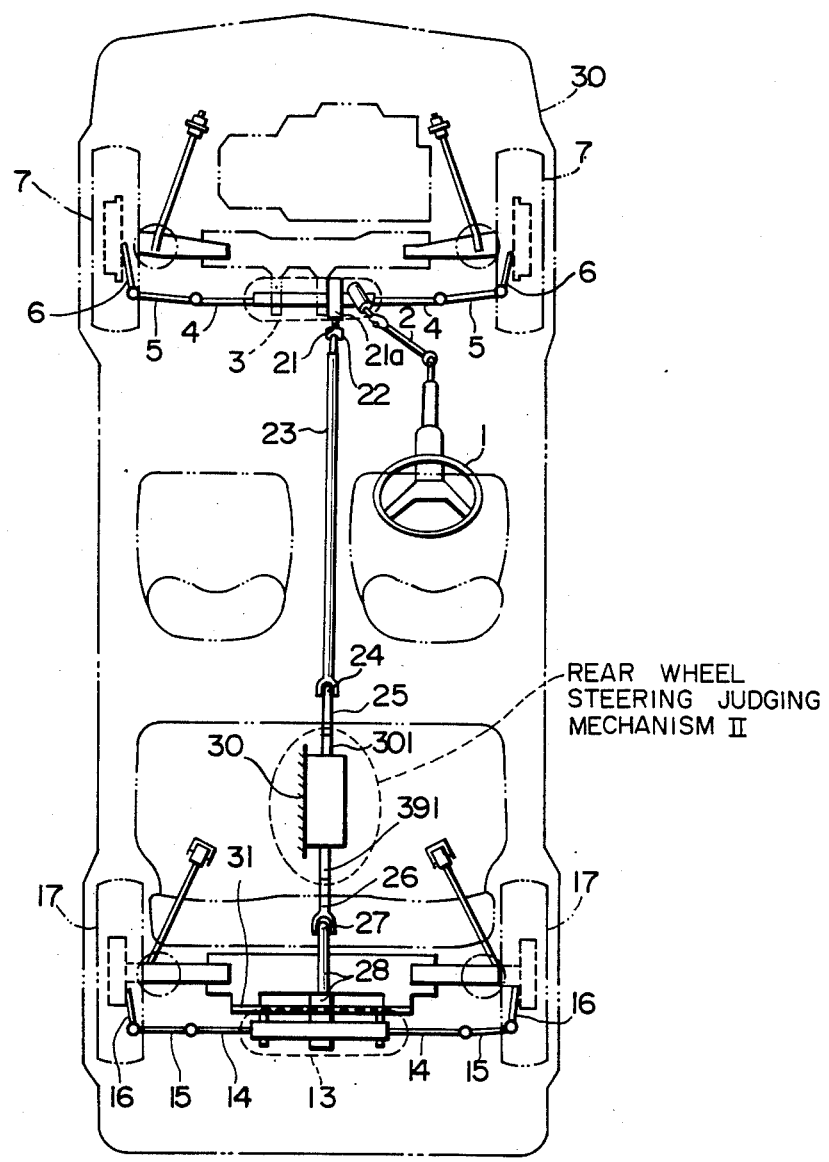
FIG. 12 is a schematic plan view of a 4-wheel steering vehicle incorporating a fifth embodiment of the rear wheel steer angle controlling apparatus of the invention.

FIG. 12 is a schematic plan view of the basic arrangement of a 4-wheel steering vehicle incorporating the fifth embodiment of the invention having the rear wheel steering judging mechanism II. The fifth embodiment will be described hereinunder mainly with regard to the points of difference between the basic arrangement shown in FIG. 4 and that shown in FIG. 12.

According to the fifth embodiment of the invention, a motion converting mechanism such as rack-and-pinion is mounted in the gear box 3. A connecting shaft 21 is connected at its one end to the motion converting mechanism and at its other end to an operation shaft 23 through a universal joint 22. The operation shaft 23 is connected through a universal joint 24 to an input shaft 25 which in turn is connected to the rear wheel steering judging mechanism II.

The rear wheel steering judging mechanism II is fixed to the body 30 of the vehicle and is connected to an output shaft 26 which in turn is connected to a final connecting shaft 28 through a universal joint 27. The final connecting shaft 28 is rotatably carried through a bearing by a bracket 31 which is fixed to the body 30 of the vehicle, and is connected to a rear gear box 13 which constitutes an actuator mechanism. The rear gear box 13 is fixed to the bracket 31 and accommodates a motion converting mechanism such as a rack-and-pinion which converts the rotation of the final connecting shaft 28 into linear motion of the linkage in the breadthwise direction of the vehicle body.

This linear motion of the linkage 14 is transmitted to the knuckle arms 16 through tie rods 15, such as to cause the knuckle arms to pivot, thereby generating a steer angle of the rear wheels 17.

The motion converting mechanism in the gear box 3, designed for rotating the connecting shaft 21 in response to the rotation of the steering wheel 1, will be described in detail hereinunder with reference to FIG. 13A. The linkage 4 has a rack 3a formed thereon along the length thereof. The rack 3a meshes with a pinion 21a formed on the connecting shaft 21. The arrangement is such that, when the steering wheel 1 is rotated counter-clockwise, the linkage 4 moves to the right as viewed in the Figure, so that the connecting shaft 21 is rotated counter-clockwise, i.e., in the same direction as the rotation of the steering wheel 1.

Figure 13A:
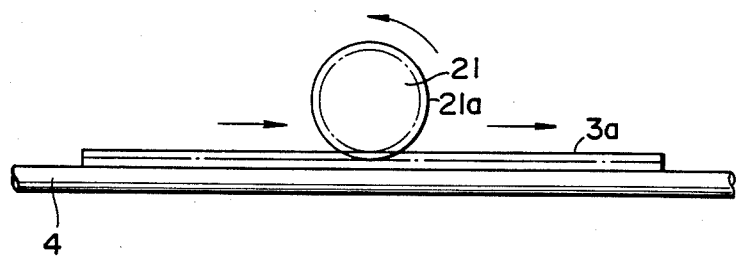
FIG. 13A is a schematic illustration of an arrangement of parts inside a front gear box in the fifth embodiment of the invention.
Figure 13B:
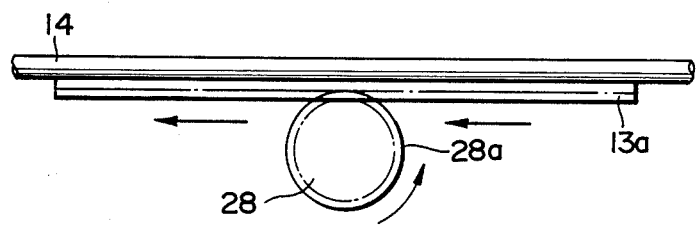
FIG. 13B is a schematic illustration of an arrangement of parts inside a rear gear box in the fifth embodiment.

Referring now to FIG. 13B, the motion converting mechanism in the rear gear box 13 includes a rack 13a formed on the linkage 14 along the length thereof and a pinion 28a formed on the final connecting shaft 28 and meshing with the rack 13a. The arrangement is such that a counter-clockwise rotation of the final connecting shaft 28 causes the linkage 14 to linearly move to the left as viewed in the Figure.

As will be understood from the foregoing explanation with reference to FIGS. 13A and 13B, the linkage 4 and the linkage 14 are adapted to be moved linearly in opposite directions in response to the rotation of the connecting shaft 21 and the final connecting shaft 28. Thus, the motion converting mechanisms in both gear boxes 3 and 13 are arranged to produce linear motions in opposite directions in response to the same rotary motion.

The basic arrangement of the rear wheel steering judging mechanism II incorporated in the fifth embodiment of the invention will be described hereinunder with reference to FIGS. 14A and 14B. The judging mechanism II has a case 300 which is fixed to the body 30 of the vehicle and rotatably carries an input shaft 301 and an output shaft 391 through bearings. The input shaft 301 is connected to the aforementioned input shaft 25 coaxially and integrally therewith. Similarly, the output shaft 391 is connected to the aforementioned output shaft 26 integrally and coaxially therewith. A spur gear 311 is integrally fixed to a portion of the input shaft 301 projecting into the case 300. The spur gear 311 meshes with another spur gear 312 such as to form a standard spur gear pair. The spur gear 312 is integrally fixed to the shaft 302 which is rotatably carried by a portion of the case 300 through bearings. The spur gear 312 in turn meshes with still another spur gear 313 such as to form a second standard spur gear pair. The spur gear 313 is integrally fixed to a shaft 303 which is rotatably carried by a portion of the case 300 through bearings and has a further spur gear 314 integrally connected thereto. The spur gear 314 meshes with a still further spur gear 315 coaxial with the input shaft 301 such as to form a third standard spur gear pair. The spur gears 311, 312, 313, 314 and 315 are arranged such that the spur gear 315 rotates in the direction counter to the direction of rotation of the input shaft 301, and are designed such that the angle of rotation of the spur gear 315 coincides with that of the input shaft 301.

The spur gear 315 is integrally connected to a flange 331 which has a cylindrical portion. The cylindrical portion is supported at its outer peripheral surface on the case 300 through a bearing and also at its inner peripheral surface by the input shaft 301 through bearings. Coiled springs 341 and 342 are fixed to the right-hand side end of the flange 331 as viewed in the drawings by means of spring retainers 340.

The coiled springs 341 and 342 are torsion coiled springs having different diameters. These two springs permit generation of an equal resetting force in response to rotational force in both directions. The other ends of the coiled springs 341, 342 are fixed to a pedestal 332 by means of spring retainers 340. The pedestal 332 is rotatably supported by the input shaft 301 through a bearing and is connected integrally to the output shaft 391 which serves as a cylinder.

Between the pedestal 332 and the output shaft 391 are disposed an "O" ring 333 and a partition plate 334, for the purpose of preventing leakage of working oil which will be mentioned later.

As shown in FIGS. 14A and 14B, the end of the input shaft 301 constitutes a rotor having a pair of diametrically opposing vanes 351 and 352. Resilient members 361, 362, e.g., coiled springs, are loaded between the radially inner ends of the vanes and the bottoms of the grooves receiving these vanes, so that the vanes 351, 352 are resiliently urged by the resilient members 361, 362 such as to keep their radially outer ends in contact with a cam ring contour formed on the inner peripheral surface of the output shaft 391. The working oil 115 mentioned before fills a cavity 370 between the cam ring contour on the inner peripheral surface of the output shaft 391 and the rotor formed by the end of the input shaft 301.

The cavity 370 is communicated with left and right by-pass conduit sections 373L and 373R through elongated grooves 601L and 601R formed in the inner peripheral surface of the right-side portion of the output shaft 391. The left by-pass conduit section 373L and the right by-pass conduit section 373R are connected to each other at their one ends through a conduit formed in the output shaft 391, while the other ends of these conduit sections are closed by suitable covers 375.

An orifice 381 is constituted by a restriction through which the left and right by-pass conduit sections 373L and 373R are connected to each other. The size or cross-sectional area of the orifice 381 can be adjusted by a control valve 380.

Thus, the left damper chamber 370L in the cavity 370 is connected to the right damper chamber 370R, through the groove 601L, left by-pass conduit section 373L, orifice 381, right by-pass conduit section 373R and the groove 601R. The space formed by these chambers, grooves, conduit sections and orifice is filled up with the working oil 115 so that this space constitutes an oil damper.

The control valve 380 is attached to the output shaft 391 and is adapted to adjust the size of the orifice 381 as an adjusting screw integral therewith is rotated. Thus, the control valve 380 is basically the same as that shown in FIG. 7B.

The operation and advantages of the fifth embodiment incorporating the rear wheel steering judging mechanism II described hereinbefore will be explained hereinunder with reference to FIGS. 14C, 14D and 14E, on an assumption that the input shaft 301 is rotated by an angle $\theta_{in}(t)$ counter-clockwise, i.e., in the direction of the arrow, in response to a counter-clockwise rotation of the steering wheel 1 by an angle $\delta_h(t)$.

In response to the counter-clockwise rotation of the input shaft 301 by the angle $\theta_{in}(t)$, the flange 331 rotates by angle $-\theta_{in}(t)$, i.e., by an angle of the same absolute value as the rotation of the input shaft 301 but in the counter direction to the same, through the operation of the series of spur gears 311, 312, 313, 314 and 315. Thus, the counter-clockwise rotation of the input shaft 301 by angle $\theta_{in}(t)$ causes the flange 331 to be rotated clockwise by the same angle $\theta_{in}(t)$.

The clockwise rotation of the flange 331 in turn causes the coiled springs 341 and 342 to be resiliently twisted clockwise so that the coiled springs 341, 342 produce resetting force which tends to rotate the pedestal 332 and the output shaft 391 clockwise. Thus, the resetting force produced by the coiled springs 341, 342 acts to rotate the output shaft 391 in the direction counter to the direction of rotation of the input shaft 301.

On the other hand, the vanes 351, 352 are rotated counter-clockwise as a result of the counter-clockwise rotation of the input shaft 301 by the angle $\theta_{in}(t)$ causing the volumes of the left damper chamber 370L and the right damper chamber 370R to be changed. As a result, the working oil is pressurized and this pressure of the oil 115 acts to rotate the cam ring contour in the output shaft 391 counter-clockwise. Thus, the pressure of the working oil 15 acts to rotate the output shaft 391 in the same direction as the rotation of the input shaft 301. Meanwhile, the working oil 115 flows from the left damper chamber 370L to the right damper chamber 370R through the groove 601L, left by-pass conduit section 373L, orifice 381, right by-pass conduit section 373R and the groove 601R. Since the flow resistance encountered by the working oil 115 due to viscosity of the oil varies depending on the speed of rotation of the input shaft 301, i.e., the speed of operation of the steering wheel 1, the characteristics of the transmission of power from the input shaft 301 to the output shaft 391 is varied in accordance with the speed of operation of the steering wheel.

Figure 14C:
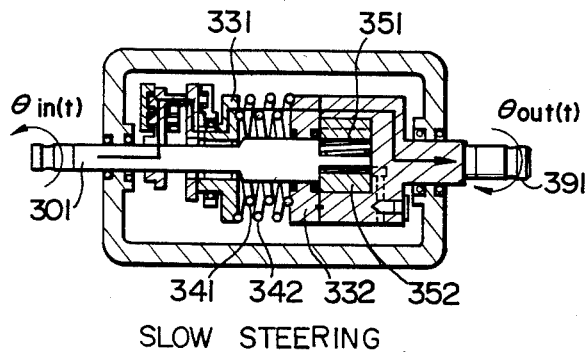
FIGS. 14C, 14D and 14E are illustrations of the operation of the rear wheel steer judging means in the fifth embodiment.

Referring now to FIG. 14C, when the speed of rotation of the input shaft 301 is low, i.e., when the steering wheel is being rotated slowly, the working oil 15 encounters almost no flow resistance, so that almost no force is transmitted from the input shaft 301 to the output shaft 391. In this case, therefore, the output shaft 391 is rotated mainly by the resetting force produced by the coiled springs 341, 342. In consequence, when the speed of operation of the steering wheel 1 is low, the output shaft 391 is rotated in the direction counter to the direction of rotation of the input shaft 301 by an angle which is substantially equal to the angle of rotation of the input shaft. Thus, when the steering wheel is rotated slowly, the relationship between the rotation angle $\theta_{out}(t)$ of the output shaft 391 and the angle $\theta_{in}(t)$ of the input shaft 301 is expressed by the following formula.

$$\theta_{out}(t) \approx -\theta_{in}(t)$$

In this case, the rotation angle $\theta_{out}(t)$ is generated in the clockwise direction.

Figure 14D:
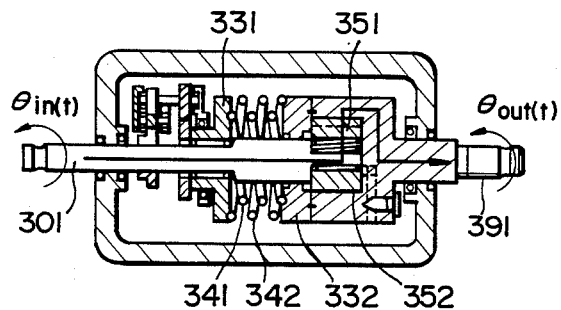
Figure 14E:
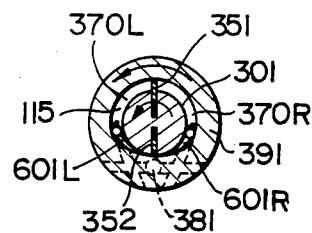

Referring now to FIG. 14D, when the rotation speed of the input shaft 301 is high, i.e., when the steering wheel is being rotated quickly, the working oil 115 encounters a large flow resistance, so that the force transmitted from the input shaft 301 to the output shaft 391 through the working oil 115, i.e., the damping force of the damper, exceeds the resetting force produced by the coiled springs 341, 342 so that these springs 341, 342 are twisted largely. In this case, therefore, the output shaft 391 is rotated by the damping force of the damper.

When the steering wheel 1 is being operated quickly, therefore, the output shaft 391 is rotated in the same direction and substantially by the same angle as the rotation of the input shaft 301. Accordingly, the relationship between the rotation angle $\theta_{out}(t)$ of the output shaft and the rotation angle $\theta_{in}(t)$ of the input shaft 301 is expressed by the following formula when the steering wheel 1 is operated quickly.

$$\theta_{out}(t) \approx \theta_{in}(t)$$

In this case, the rotation angle $\theta_{out}$ is generated in the counter-clockwise direction.

When the input shaft 301 is rotated at a medium speed between the high and low speeds mentioned above, i.e., when the steering wheel is being operated at a medium speed, the damping force of the damper constituted by the input shaft 301 and the output shaft 391 are substantially balanced by each other, so that the output shaft 391 is not rotated substantially.

The operation of the fifth embodiment will be described hereinunder with reference to FIGS. 15A and 15B. As in the case of the rear wheel steering judging mechanism used in the first embodiment, the rear wheel steering judging mechanism II incorporated in the fifth embodiment judges the speed of operation of the steering wheel 1 from the speed of rotation of the input shaft 25 which rotates in response to the rotation of the steering wheel 1. In addition, the rear wheel steering judging mechanism II determines the angle and direction of rotation of the output shaft 26 in accordance with the result of the judgement. Namely, when the steering wheel 1 is being operated slowly, i.e., when the rotation speed of the input shaft 25 is low, the output shaft 26 is rotated in the direction counter to the direction of rotation of the input shaft 25 by an angle corresponding to the angle of rotation of the input shaft 25, whereas, when the steering wheel 1 is being rotated at a high speed, i.e., when the speed of rotation of the input shaft 25 is high, the output shaft 26 is rotated in the same direction and by the same angle as the rotation of the input shaft 25.

As the steering wheel 1 is rotated counter-clockwise, i.e., in the direction of the arrow L, the shaft 2 also rotates counter-clockwise. This counter-clockwise rotation of the shaft 2 is converted, through the motion converting mechanism such as rack-and-pinion in the gear box 3, into rightward linear motion of the linkage 4 which in turn causes the tie rods 5 to move to the right. In consequence, the knuckle arms 6 are rotated counter-clockwise, thus steering the front wheels 7 to the left. The rightward linear motion of the linkage 4 is converted by the other motion converting mechanism in the gear box 3 into counter-clockwise rotation of the connecting shaft 21 which is transmitted through the operation shaft 23 to the input shaft 25 such as to rotate the latter counter-clockwise. The rear wheel steering judging mechanism II judges the speed of operation of the steering wheel 1 in accordance with the rotation of the input shaft 25, and determines the direction and angle of rotation of the output shaft 26 in accordance with the result of the judgement such that, when the steering wheel 1 is being operated slowly, the output shaft 26 is rotated clockwise, i.e., in the direction counter to the direction of rotation of the input shaft 25 and by an angle corresponding to the angle of rotation of the input shaft as shown in FIG. 15A, whereas, when the steering wheel 1 is being rotated quickly, the output shaft 26 is rotated in the same direction as the input shaft 25, i.e., counter-clockwise, by an angle corresponding to the angle of rotation of the input shaft 25. The rotation of the output shaft 26 causes a rotation of the final connection shaft 28 which in turn is converted by the motion converting mechanism in the rear gear box 13 into linear movement of the linkage 14.

Figure 15A:
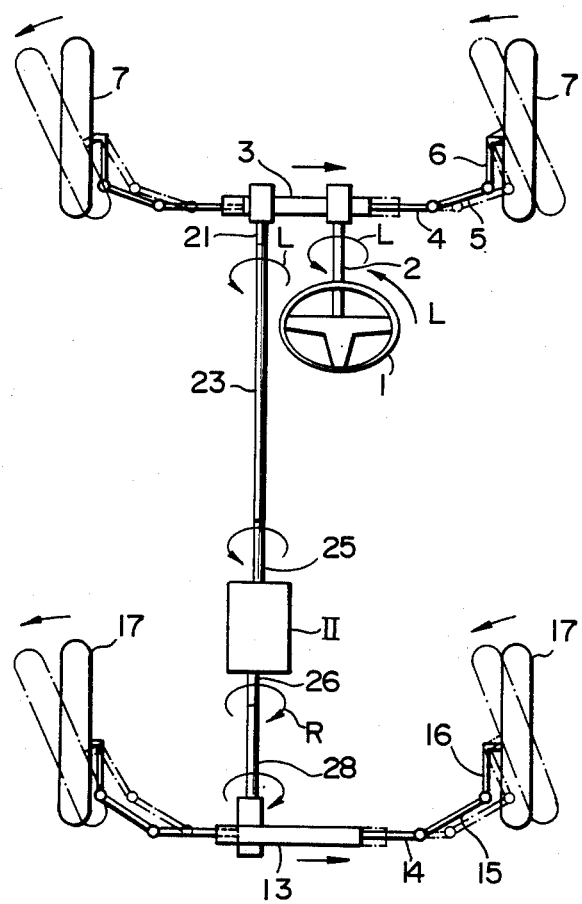
FIGS. 15A and 15B are schematic illustrations of operation of the fifth embodiment.
Figure 15B:
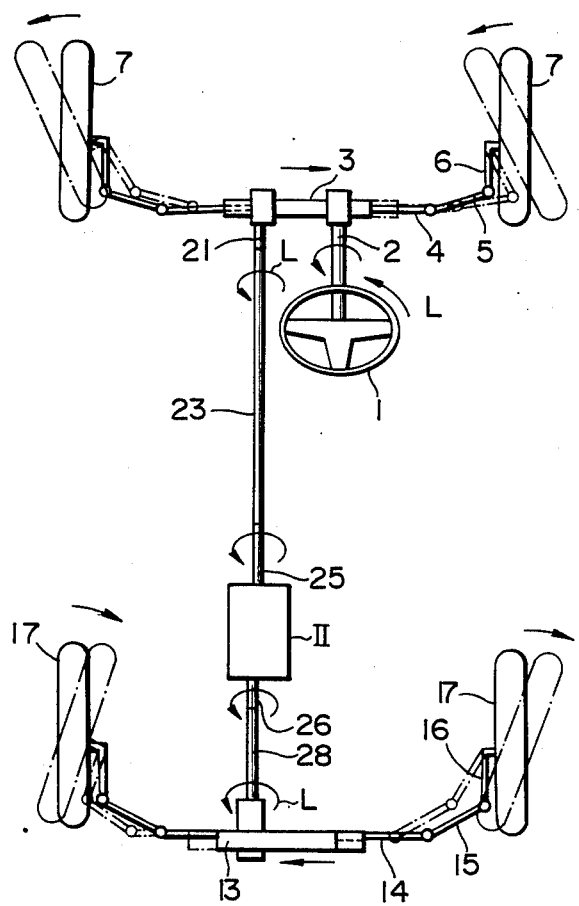

As shown in FIG. 15A, the clockwise rotation of the final connection shaft 28 is converted by the gear box 13 into rightward linear motion of the linkage 14 which in turn causes the knuckle arms 16 to rotate counter-clockwise through the action of the tie rods 15, such as to steer the rear wheels 17 to the left. Conversely, a counter-clockwise rotation of the final connection shaft 28 is converted into leftward linear motion of the linkage 14 by the gear box 13, which in turn causes the knuckle arms 16 to rotate clockwise through the action of the tie rods 15, thus steering the rear wheels 17 to the right.

As has been described, in the fifth embodiment of the invention, the rear wheel steering judging mechanism II judges the speed of operation of the steering wheel 1 and steers the rear wheels in the same direction as the front wheels when the steering wheel 1 is being operated slowly and in the direction counter to the direction of steer of the front wheels when the steering wheel is being operated quickly, by an angle corresponding to the angular displacement of the steering wheel. In addition, almost no steer angle is formed for the rear wheels when the steering wheel is being rotated at a medium speed.

According to this embodiment, since both the input and output are obtained in the form of rotation of shafts, the rear wheel steering judging mechanism can be mounted between any rotary shafts extending in the longitudinal direction of the vehicle body, e.g., between the connection shaft and the operation shaft. This facilitates the mounting of the rear wheel steering judging mechanism in the restricted space on the vehicle body without risk of mechanical interference which is generally encountered in the determination of arrangement of parts on the vehicle body. In addition, since the rotary members such as gears requiring lubrication are accommodated by a compact case, the apparatus of the invention can be arranged on the vehicle body equally as other devices and apparatus. In addition, the apparatus of this embodiment can be demounted as a unit with the case, so that the repair and maintenance are facilitated. These features are quite advantageous considering that the apparatus is mounted on a vehicle.

In the described embodiment, the orifice is formed in the output shaft which serves also as a cylinder. This, however, is not exclusive and the orifice may be formed in each of the vanes 351, 352. In such a case, however, it would be difficult to provide means for adjusting the size of the orifice.

Figure 16A:
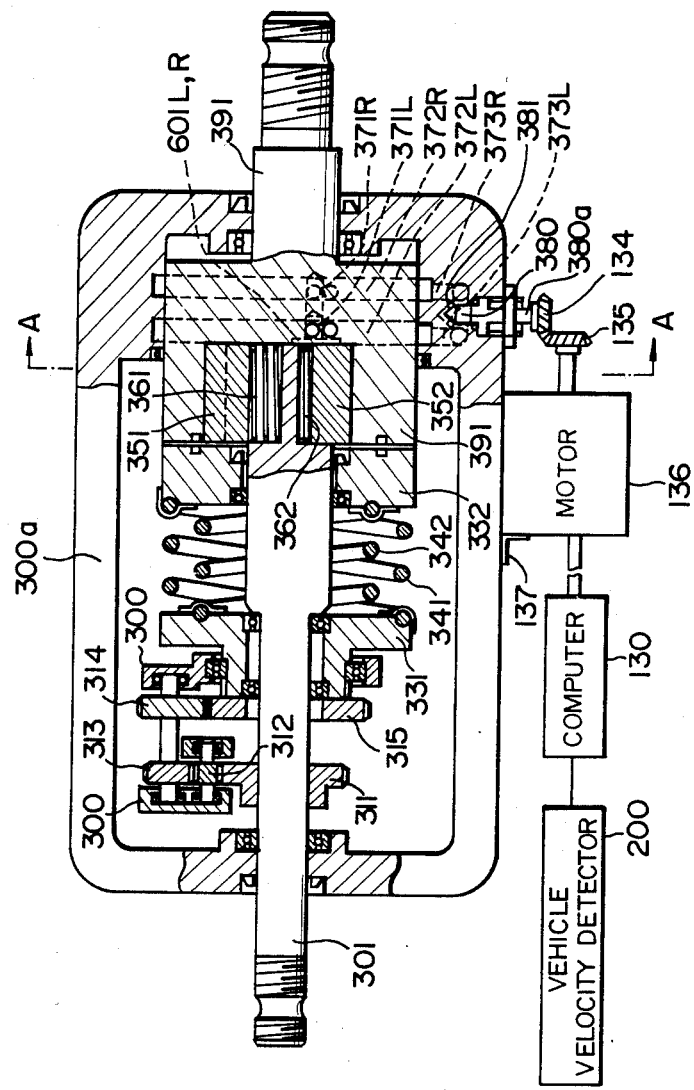
FIG. 16A is a sectional view of a rear wheel steer judging means in a sixth embodiment of the invention.
Figure 16B:
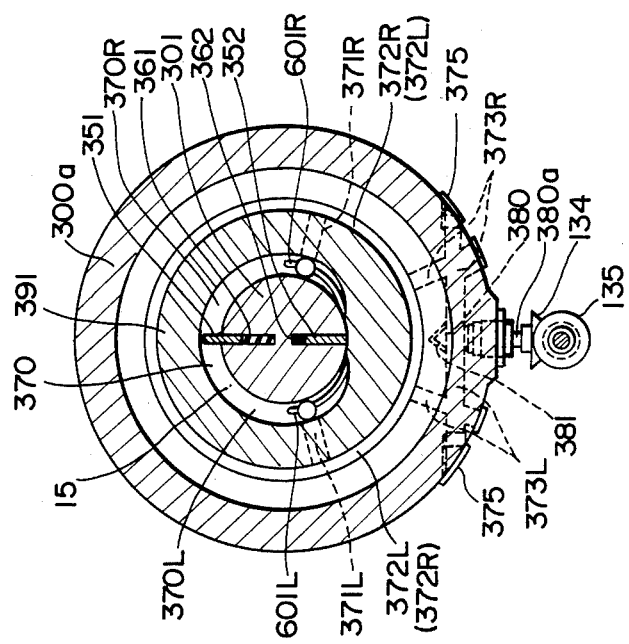
FIG. 16B is a sectional view taken along the line A—A of FIG. 16A.

A sixth embodiment of the invention having a different rear wheel steering judging mechanism will be explained hereinunder with reference to FIGS. 16A and 16B. The rear wheel steering judging mechanism II in this sixth embodiment is basically the same as that used in the fifth embodiment but is discriminated from the same in that the size of the orifice 381 is automatically changed by a driving means such as a motor which is controlled by the microcomputer 130 mounted on the vehicle, such as to automatically adjust the damping force of the damper constituted by the input shaft 301 and the output shaft 391.

The following description of the sixth embodiment, therefore, will be focussed mainly on this point of difference. As shown in FIG. 16B, a cavity 370 is formed between the outer peripheral surface of the rotor portion of the input shaft 301 and the cam ring contour on the inner peripheral surface of the output shaft 391. The cavity is composed of a left damper chamber 370L and a right damper chamber 370R which are communicated with a first left conduit 371L and a first right conduit 371R, respectively, through elongated grooves 601L and 601R which are formed in the inner surface of a right-hand side portion of the output shaft 391.

The first left conduit 371L and the first right conduit 371R are conduits for the working oil 115 provided in the output shaft 391. The first left conduit 371L and the first right conduit 371R are communicated with a second left conduit 372L and a second right conduit 372R, respectively. The second left and right conduits 372L, 372R are the conduits for the working oil 115 which are formed by ring-like grooves formed in the inner surface of the case 300a and sealed with the outer surface of the output shaft 391.

The second left conduit 372L and the second right conduit 372R are communicated with a left by-pass conduit 373L and a right by-pass conduit 373R, respectively. The left and right by-pass conduits 373L and 373R are conduits for the working oil 115 formed in the case 300a. These by-pass conduits 373L and 373R are communicated with each other at their one ends through an orifice 381 while the other ends of these by-pass conduits 373L and 373R are closed by covers 375. The orifice 381 is a restriction the size of which is controllable by the control valve 380. The control valve 380 is attached to the case 300a and is movable up and down such as to vary the size of the orifice 381 through rotation of the adjusting screw 380a. The basic arrangement of this control valve 380 is basically the same as that shown in FIG. 8B.

Thus, the left damper chamber 370L of the cavity 370 is communicated with the right damper chamber 370R through the groove 601L, first left conduit 371L, second left conduit 372L, left by-pass conduit 373L, orifice 381, right by-pass conduit 373R, second right conduit 372R, first right conduit 371R and the groove 601R. The space formed by these chambers, conduits and orifice is filled up with the working oil so that an oil damper is formed. Since some portions of the conduits are formed in the case 300a, the case 300a has a shape which is slightly different from that of the case 300 shown in FIG. 14A. Namely, the thickness of the case 300a is locally increased at portions thereof where the conduits are formed. In addition, the inner peripheral surface of the case 300a has a portion contacting the output shaft 391.

The adjusting screw 380a integral with the control valve 380 is integrally fixed to a bevel gear 134 which meshes with another bevel gear 135 such that both bevel gears in combination constitute a pair of miter gears. The bevel gear 135 is fixed to the shaft of a motor 136 such as to be driven by the motor 136. The motor 136, which is reversible, is secured to the case 300a by means of a retainer 137, and is electrically connected to a microcomputer 130 mounted on the vehicle, such as to be controlled by the microcomputer 130. To the microcomputer 130 are connected to the vehicle velocity detector 200 shown in FIG. 9A or the yaw rate detector shown in FIG. 10A. Thus, the microcomputer 130 varies the cross-sectional area of the orifice in the same way as the third embodiment.

Namely, according to this sixth embodiment, the motor 136 is operated by the control signal issued from the microcomputer 130 such as to drive the adjusting screw 380a through the pair of miter gears, i.e., the bevel gears 134, 135, so that the control valve 380 is moved up and down to vary the size of the orifice 381. It is, therefore, possible to automatically change the gap of the orifice 381 in accordance with the instruction given by the microcomputer 130, whereby the damping force of the damper between the input shaft 301 and the output shaft 391 is automatically changed. Thus, the size of the orifice is controlled by the control signal which is produced and delivered by the microcomputer in accordance with the vehicle velocity or state of running of the vehicle. This means that the damping force of the damper is controlled in accordance with the state of running of the vehicle.

As has been described, according to the sixth embodiment of the invention, the level of judgement of the speed of operation of the steering wheel is automatically changed through a change in the damping force of the damper which is effected by the automatic adjustment of the orifice size by means of the computer, so that the angle and direction of steer of the rear wheels can be automatically determined and controlled in accordance with the state of running of the vehicle advantageously.

Although coiled springs are used as the resilient members in the first to sixth embodiments described hereinbefore, this is not exclusive and any type of resilient members which can be resiliently deformed to produce resilient resetting force, e.g., rubber bush, can be used as the resilient members in the apparatus of the invention.

The gears used as means for transmitting the rotation in the fifth and sixth embodiments may be replaced with combinations of pulleys and an endless means such as belt or wire, provided that suitable means are provided for preventing any slip of the belt or wire on the pulleys. In addition, the oil dampers used as the dash pot in the described embodiments may be obviously substituted by a gas-type damper or a damper which simultaneously uses both a gas and oil. In addition, as explained before in connection with the first embodiment, a power steering device can be incorporated in the apparatus of the invention in order to assist the manual steering power, if a large power is required for operating the steering wheel.

Figure 17:
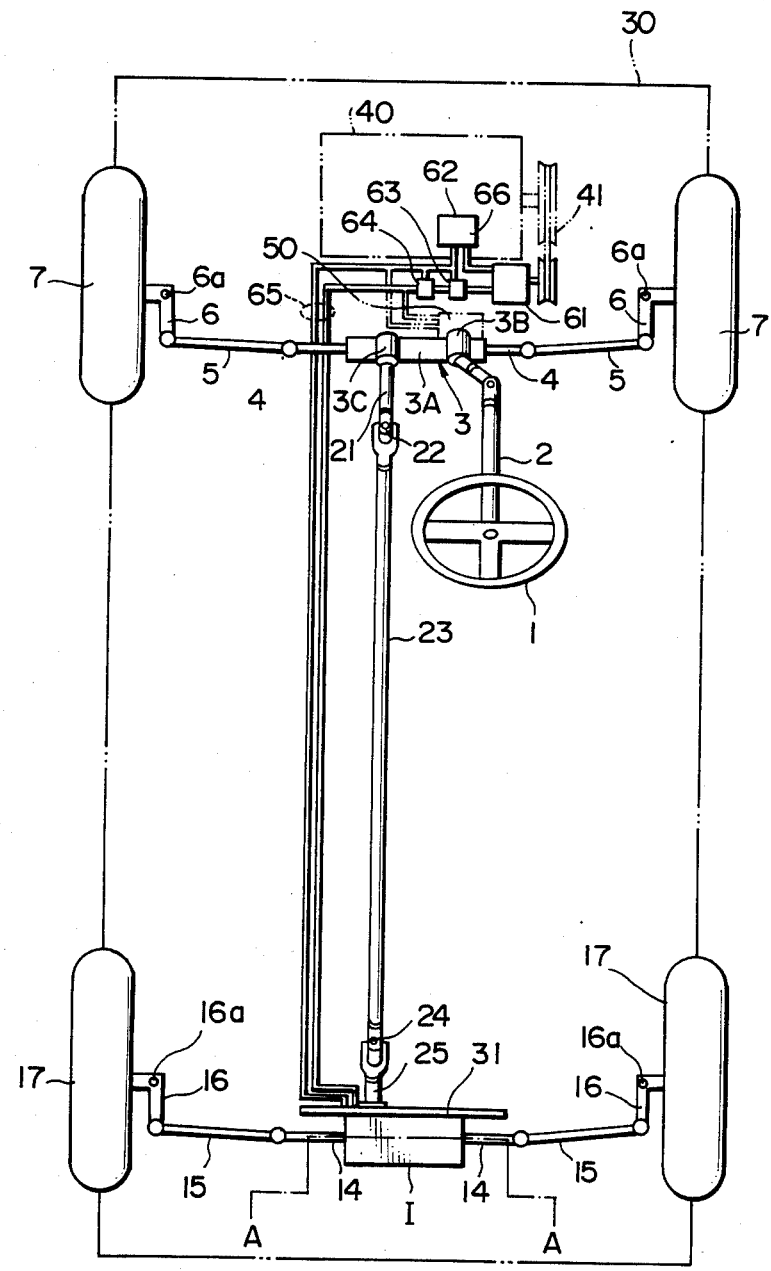
FIG. 17 is a schematic illustration of a seventh embodiment of the invention.

FIG. 17 shows a schematic plan view of a 4-wheel steered vehicle incorporating a seventh embodiment of the apparatus of the invention for controlling rear wheels of vehicles.

A steering wheel 1 is connected to a gear box 3 through a shaft 2. The gear box 3 accommodates a first motion converting mechanism for converting the rotation of the shaft 2 into linear motion in the breadthwise direction of the vehicle body and a second motion converting mechanism for converting the rotation of the shaft 2 into a rotary motion about an axis which extends in the longitudinal direction of the vehicle body. More specifically, the first motion converting mechanism is constituted by a rack 3A extending in the breadthwise direction of the vehicle and a pinion 3B connected to the shaft 2 and meshing with the rack 3A such as to convert the rotation of the shaft 2 into linear motion in the breadthwise direction of the vehicle body. On the other hand, the second conversion mechanism is composed of the rack 3A and a pinion 3C meshing with the rack 3A such as to convert the rotation of the shaft 2 into a rotary motion about an axis extending in the longitudinal direction of the vehicle body.

To both ends of the rack 3A in the gear box 3 are integrally connected linkages 4 each of which is connected at its other end to a knuckle arm 6 through a tie rod 5. Each knuckle arm 6 is pivotally supported through a bearing on a pivot shaft 6a. A front wheel 7 is rotatably carried by the end of the knuckle arm 6.

Thus, the front wheels 7 are steered as the knuckle arms 6 pivot about the pivot shafts 6a in response to the operation of the steering wheel 1.

The pinion 3C in the gear box 3 is integrally connected to a connecting shaft 21 which in turn is connected to an input shaft 25 through a universal joint 22, operation shaft 23 and another universal joint 24. The input shaft 25 is rotatably supported through a bearing by a bracket 31 fixed to the vehicle body 30, and is connected to a rear wheel steering judging mechanism I. Therefore, the input shaft 25 is rotated in the same direction as the steering wheel 1 such as to transmit the rotation of the steering wheel 1 to the rear wheel steering judging mechanism I.

Linkages 14 which constitute an actuating mechanism project from the rear wheel steering judging mechanism I. Each linkage 14 is connected through a tie rod 15 to a knuckle arm 16 which is adapted to pivot about a pivot shaft 16a. Each of rear wheels 17 is rotatably carried by the end of the knuckle arm 16. The arrangement is such that a rotation of the steering wheel is converted through the rear wheel steering judging mechanism I into linear motion of the linkages 14 in the breadthwise direction of the vehicle body, which in turn causes the knuckle arms 16 to pivot about pivot shafts 16a, thus steering the rear wheels 17.

Figure 18:
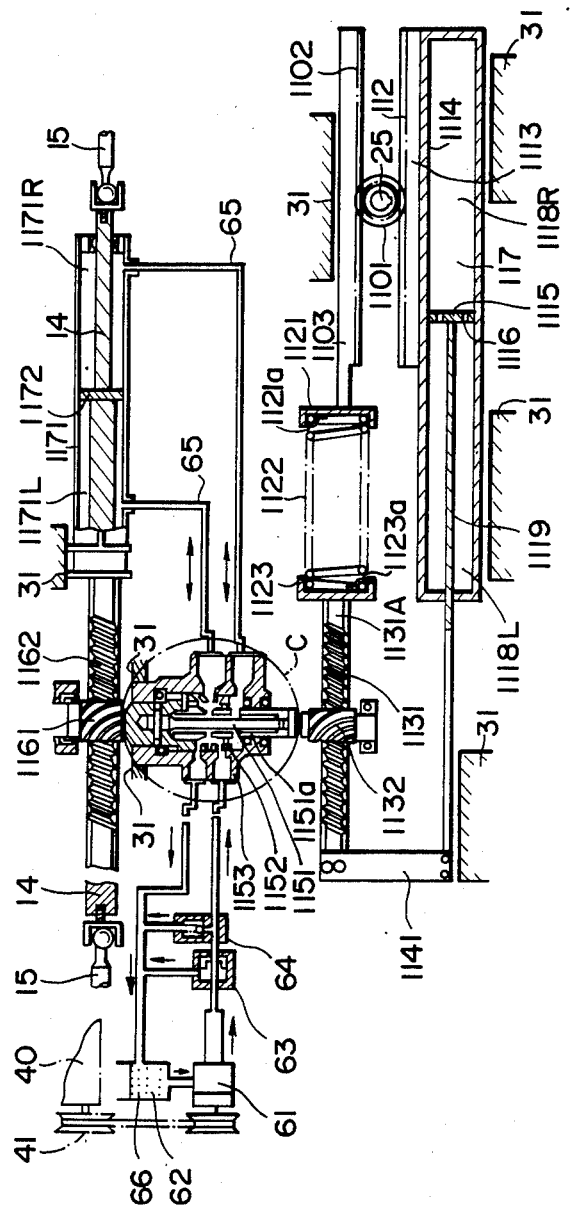
FIG. 18 is a sectional view of a rear wheel steer judging means and actuating means in the seventh embodiment of the invention taken along line A—A of FIG. 17.

As will be seen from FIG. 18, a power steering fluid 66 is supplied to and discharged from the actuating mechanism, through hydraulic pipes 65. The power steering fluid 66 is delivered by a vane pump 61 which is driven through a belt 41 by an engine 40 such as to produce hydraulic pressure. The power steering fluid 66 delivered by the vane pump 61 is supplied to the actuating mechanism connected to the rear wheel steering judging mechanism I, through a flow rate control valve 63 which controls the flow rate and through a pressure adjusting valve 64 which limits the maximum pressure. Part of any excessive power steering fluid in the actuating mechanism, flow rate control valve 63, pressure adjusting valve 64 is returned to an oil tank 62, while the other part of the excessive fluid is returned to the suction side of the vane pump 61 such as to be recirculated through the power steering system.

If the vehicle is equipped with an ordinary power steering system for front wheels having a power cylinder 50 in the gear box 3, the pressure of the power steering fluid produced by the pressure generating device of the front wheel power steering system may be utilized as the pressure generating device for the rear wheel power steering system.

If the steering of the rear wheels requires a greater power, it is advisable to provide an accumulator for accumulating the hydraulic pressure in a part of either one of the hydraulic pipes 65.

An explanation will be made hereinunder as to the operation of the seventh embodiment, in particular the rear wheel steering judging mechanism I and the actuating mechanism with reference to FIG. 18 which is a sectional view taken along the line A—A of FIG. 17. It is to be understood that, in this seventh embodiment, the gear box 3 is modified such that the pinion 3B and the pinion 3C directly mesh with each other, so that the connecting shaft 25 rotates in the direction counter to the direction of rotation of the steering wheel.

The explanation will be commenced first with the rear wheel steering judging mechanism I.

The input shaft 25 has a pinion 1101 formed on one end thereof, and is rotatably supported through a bearing by a bracket 31 attached to the vehicle body 30. A rod 1103 serving as the first member and a rod 1113 serving as the second member are disposed in symmetry with each other with respect to the input shaft 25. A rack 1102 meshing with the pinion 1101 is formed on the surface of the rod 1103 adjacent the input shaft 25. Similarly, a rack 1112 meshing with the pinion 1101 is formed on the surface of the rod 1113 adjacent the input shaft 25. The rod 1103 is carried by the bracket 31 for movement to the left and right as viewed in the Figure, i.e., in the breadthwise direction of the vehicle body, and is connected at its one end to a right spring seat 1121. A coiled spring 1122 is secured at its one end to the right spring seat 1121 through a spring retainer 1121a, while the other end of the coiled spring 1122 is fixed through a spring retainer 1123a to a left spring seat 1123. The left spring seat 1123 is connected to one end of an output shaft 1131A on which a rack 1131 is formed.

The rack 1131 meshes with the pinion 1132 constituting a part of the actuating mechanism, while the other end is connected to one end of a connecting member 1141. One end of the pinion 1132 is rotatably carried through a bearing by the bracket 31.

The rod 1113 having the rack 1112 is integrally connected to a cylinder 1114 which is filled with a working oil 1117 having a predetermined viscosity. The cylinder 1114 is carried for movement to the left and right as viewed in the drawing, i.e., in the breadthwise direction of the vehicle body. A piston 1115 having an orifice 1116 of a predetermined restriction diameter is received in the cylinder 1114 such as to divide the space in the cylinder 1114 into a left cylinder chamber 1118L and a right cylinder chamber 1118R. A piston rod 1119 is connected at its one end to the piston 1115. The other end of the piston rod 1119 is extended through one end wall of the cylinder 1114 and is supported for movement in the breadthwise direction of the vehicle body. The extremity of this end of the piston rod 1119 is connected to the connecting member 1141 mentioned before. The cylinder 1114, working oil 1117, and the piston 1115 with the orifice 1116 constitutes an oil damper which serves as an oil dash pot.

Figure 19:
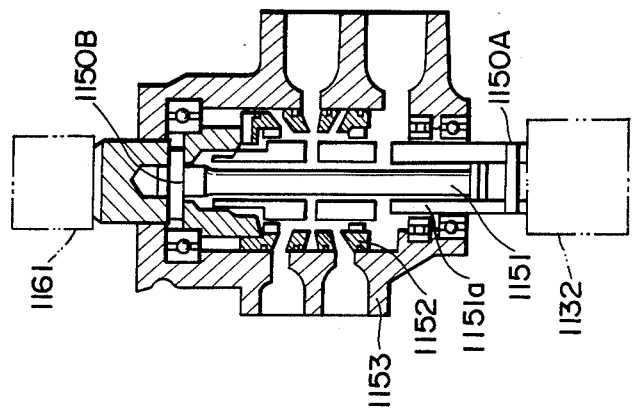
FIG. 19 is an enlarged view of a control valve C shown in FIG. 18.

An explanation will be made hereinunder as to the actuating mechanism. The actuating mechanism includes a control valve as shown in a larger scale in FIG. 19 and a power cylinder. The control valve has a control valve shaft 1151a which is fixed at its one end to the pinion 1132 and rotatably held at its other end, and a rotary valve 1152 having one end fixed to a pinion 1161 and held rotatably at its other end. A torsion bar 1151 is connected at its one end to the control valve shaft 1151a through a pin 1150A and at its other end to the rotary valve 1152 through a pin 1150B. Thus, the torque is transmitted through the control valve shaft 1151a and the torsion bar 1151 from the pinion 1132 to the rotary valve 1152 fixed to the pinion 1161. When the reactional force from the ground surface is applied to the pinion 1161 through the linkages and other associated members, the torsion bar 1151 is twisted so that a rotational offset is caused between the control valve shaft 1151a fixed to the pinion 1132 and the rotary valve 1152 fixed to the pinion 1161, due to the twisting of the torsion bar 1151.

The housing 1153 is fixed to the bracket 31 and rotatably carries the torsion bar 1151, control valve shaft 1151a and the rotary valve 1152 through bearings. The housing 1153 has a plurality of ports some of which are communicated with the oil tank 62 and the vane pump 61 through suitable pipes, while other ports are communicated with the left and right power cylinder chambers 1171L and 1171R through oil pipes 65.

According to this arrangement, a relative rotary motion is caused between the control valve shaft 1151a and the rotary valve shaft 1152 by an amount corresponding to the angle of twisting of the torsion bar 1151 through which the control valve shaft 1151a is connected to the torsion bar 1151, whereby a restriction is formed in the hydraulic circuit such as to effect the switching and control of the hydralic pressure.

The other end of the pinion 1161 is rotatably supported by the bracket 31 through a bearing and is held in engagement with the rack 1162. One end of the rack 1162 constitutes a linkage 14 which is connected to a tie rod 15. The other end of the rack 1162 constitutes a piston rod which is extended into a power cylinder 1171 and connected to a power piston 1172.

The power piston 1172 and the power cylinder 1171 in combination constitute a hydraulic booster device which operates with the power steering fluid 66. The power cylinder 1171 is fixed to the bracket 31.

The piston rod in the right power cylinder chamber 1171R is connected at its one end to the power piston 1172 while its other end constitutes the linkage 14 connected to the tie rod 15. The tie rod 15 is connected to the rear wheel 17 through a knuckle arm 16 (see FIG. 17).

An explanation will be made hereinunder as to the operation of the seventh embodiment.

The shaft 2 rotates in accordance with the operation of the steering wheel 1. The rotation of the shaft 2 is converted into linear displacement of the tie rods 5 through the action of the motion converting mechanism in the gear box 3 and the linkages 4. The linear displacement causes each knuckle arm 6 to pivot about the pivot shaft 6a, thereby generating a steer angle of the front wheel 7. Another motion converting mechanism in the gear box 3 causes the connecting shaft 21 to be rotated in response to the operation of the steering wheel. The rotation of the connecting shaft is transmitted through the universal joint 22, operation shaft 23 and another universal joint 24 to the input shaft 25 thus causing the input shaft 25 to rotate. The rear wheel steering judging mechanism 1 then judges the speed of rotation of the input shaft 25, i.e., the speed of rotation of the steering wheel 1, and determines the direction and angle of steer of the rear wheels 17 in accordance with the result of the judgement and the rotational displacement of the input shaft 25, i.e., the angle of rotation of the steering wheel 1, thereby causing linear motion of the linkages 14. Since the hydraulic pressure generated by the vane pump 61 assists the power required for the linear motion of the linkages 14, the steering wheel 1 can be operated with a reduced manual force. The linear displacement of the linkages 14 causes the knuckle arms 16 to pivot about the pivot shafts 16a through the action of the tie rods 15, so that the rear wheels 17 are steered in the direction and by the angle determined by the rear wheel steering judging mechanism I.

The operation of the rear wheel steering judging mechanism I and the actuating mechanism will be described in more detail with specific reference to FIGS. 20A to 20C.

Figure 20A:
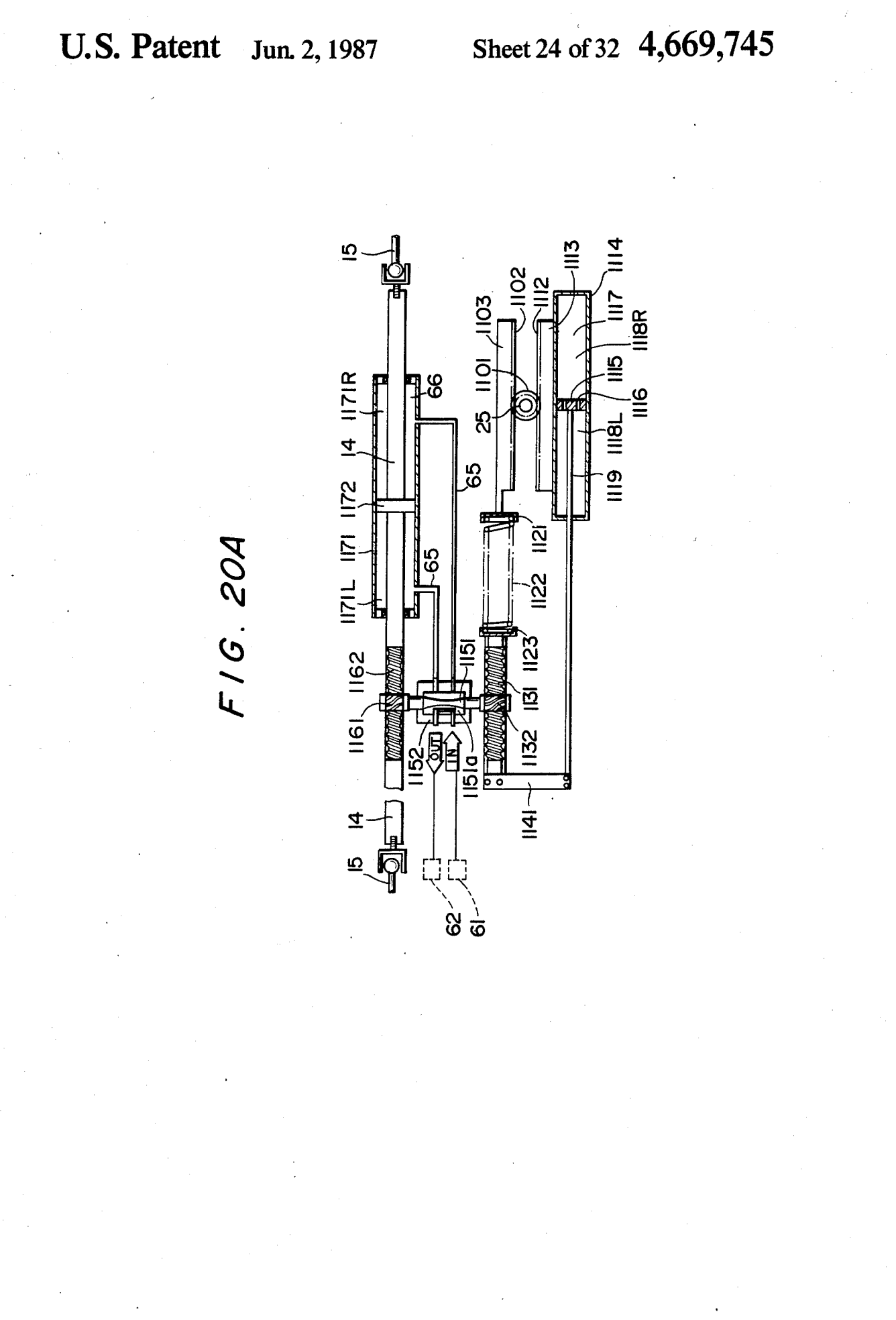

FIG. 20A shows the state of the rear wheel steering judging mechanism I and the actuating mechanism attained when the steering wheel 1 is held in the neutral position for keeping the course of the vehicle straight.

In this state, the input shaft 25 is not rotated but is held stationary, so that the coiled spring 1122 is allowed to expand to its full length. In this case, no relative rotation is produced between the pinion 1132 and the pinion 1161 so that the torsion bar 1151 is not twisted. Therefore, the control valve shaft 1151a does not rotate and is held in the neutral position with respect to the rotary valve 1152. Consequently, the power steering fluid 66 supplied from the vane pump 61 is returned to the oil tank 62 through a return port which is formed between the rotary valve 1152 and the conrol valve shaft 1151a. In addition, although the left and right power cylinder chambers 1171L and 1171R are kept under a pressure, no pressure difference is produced between these chambers because there is no flow of oil. Consequently, no force which would drive the power piston 1172 is produced.

Figure 20B:
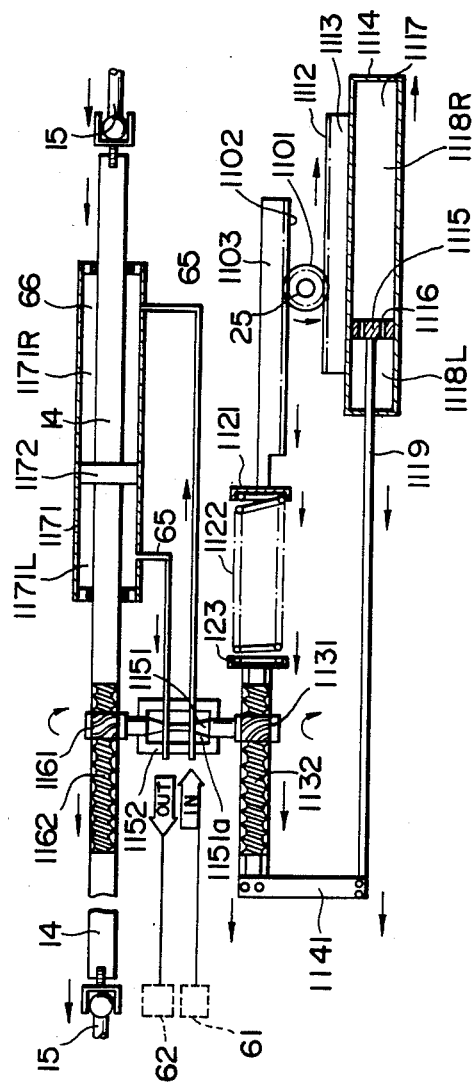

Imagine that the steering wheel 1 is rotated slowly clockwise such as to steer the front wheels to the right as shown in FIG. 20B. In response to the slow clockwise rotation of the steering wheel 1, the input shaft 25 is rotated slowly in the direction of the arrow in FIG. 20B, by the action of the motion converting mechanism in the gear box 3. This rotation of the input shaft 25 and, hence, the rotation of the pinion 1101 causes the rack 1102 and the rod 1103 to move to the left as shown by an arrow and also the rack 1112 and the rod 1113 to move to the right as shown by an arrow. As a result, the rod 1103 drives the right spring seat 1121 to the left while the rod 1113 drives the cylinder 1114 to the right. The right spring seat 1121 driven by the rod 1103 tends to urge the right end of the coiled spring 1122 to the left. The coiled spring 1122 is compressed by the spring seat 1121 and produces a resetting force which acts to drive the left spring seat 1123 to the left. On the other hand, the rightward movement of the cylinder 1114 as a result of movement of the rod 1113 causes the volumes of the left cylinder chamber 1118L and the right cylinder chamber 1118R to be decreaed and increased, respectively. In consequence, the working oil 1117 flows from the left cylinder chamber 1118L of the higher pressure to the right cylinder chamber 1118R of the lower pressure, through the orifice 1116 formed in the piston 1115. The working oil 1117 flowing through the orifice 1116 encounters a resistance, i.e., damping force, corresponding to the velocity of movement of the cylinder 1114, tending to urge the piston 1115 to the right. In this case, the cylinder 1114 is moved slowly to the right in accordance with the transmission function of formula (7), at a speed corresponding to the speed of operation of the steering wheel 1, so that no substantial damping force is applied to the piston 1115. Therefore, the resetting force of the coiled spring 1122 which acts to urge the rack 1132 to the left exceeds the force which is produced by the damping force on the piston 1115 in such a direction as to move the rack 1132 (output shaft) to the right through the piston rod 1119 and the connecting member 1141, so that the rack 1132 is moved to the left. The amount of this movement of the rack 1132 is substantially equal to the amount of leftward movement of the rack 1102 when the speed of rotation of the input shaft 25, i.e., the speed of the steering wheel 1, is very low. The leftward movement of the rack 1132 tends to rotate the pinion 1131 to the right, i.e., clockwise, which in turn tends to rotate the pinion 1161 clockwise through the torsion bar 1151. However, since the reactional force from the ground is transmitted to the pinion 1161 through the rear wheels, tie rods 15, linkages 14 and the rack 1162, the torsion bar 1151 is twisted to cause the control valve shaft 1151a to be rotated with respect to the rotary valve 1152 by an angle corresponding to the amount of twist of the torsion bar 1151. As a result of this rotation of the control valve shaft 1151a relative to the rotary valve 1152, a hydraulic passage as shown in FIG. 20B is formed in the control valve so that the power steering fluid 66 displaced from the vane pump 61 is supplied into the right power cylinder 1171R of the power cylinder 1171 such as to produce a force which tends to displace the power piston 1172 to the left, thus assisting the force for producing the rear wheel steer angle rightward. Meanwhile, the power steering fluid 66 in the left power cylinder chamber 1171L is returned to the oil tank 62 through a hydraulic passage which is formed as a result of the rotation of the control valve shaft 1151a relative to the rotary valve 1152.

An explanation will be made hereinunder as to the case where the steering wheel is quickly rotated clockwise such as to steer the front wheels to the right as shown in FIG. 20C. In response to the quick clockwise rotation of the steering wheel, the input shaft 25 rotates quickly as indicated by an arrow in FIG. 20C. This rotation causes the rack 1102 and the rod 1103 to move to the left and also the rack 1112 and the rod 1113 to move to the right, respectively, through the action of the pinion 1101. As a result, the rod 1103 drives the right spring seat 1121 to the left while the rod 1113 drives the clyinder 1114 to the right, as in the case of the slow steering explained in conjunction with FIG. 20B. The right spring seat 1121 urges the right end of the coiled spring 1122 to the left, thus compressing the coiled spring 1122 which in turn produces a resetting force acting the left spring seat 1123 to the left. On the other hand, the cylinder 1114 is moved to the right quickly in response to the quick steering operation of the steering wheel 1, so that a large damping force acts on the piston 1115. This damping force tends to drive the piston 1115 and, through the piston rod 1119 and the connecting member 1141, the rack 1132 rightward. In this case, the damping force on the piston 1115 tending to drive the rack 1132 to the right is greater than the resetting force of the coiled spring 1122, and the coiled spring 1122 is compressed such as to allow the rack 1132 to move to the right. When the speed of rotation of the input shaft 25, i.e., the speed of operation of the steering wheel 1, is extremely high, the amount of rightward movement of the rack 1132 is substantially equal to the amount of the rightward movement of the rack 1112.

The rightward movement of the rack 1132 causes the pinion 1131 to be rotated to the left, i.e., clockwise, which in turn twists the torsion bar 1151 with the pinion 1161 rotated counter-clockwise tending to move the rack 1162 to the right. As a result, the control valve shaft 1151a rotates counter-clockwise by an angle corresponding to the angle of twist of the torsion bar 1151. The rotation of the control valve shaft 1151a relative to the rotary valve 1152 forms a hydraulic passage through which the steering fluid 66 delivered by the vane pump 61 is supplied into the left power cylinder chamber 1171L of the power cylinder 1171, such as to urge the power piston 1172 to the right, thus assisting the force for generating the steer angle of rear wheels 17 leftward. Meanwhile, the power steering fluid 66 in the right power cylinder chamber 1171R is returned to the oil tank 62 through a hydraulic passage which is produced as a result of the rotation of the control valve shaft 1151a relative to the rotary valve 1152.

When the steering wheel is being operated at a medium speed between the high and low speeds explained above, i.e., when the damping force by the coiled spring 1122 and the damping force of the oil damper substantially balance each other, the rack 1132 does not move substantially. This means that the pinion 1131 and, hence, the control valve shaft 1151a do not rotate substantially. In this case, therefore, the rear wheel steer system takes the state substantially the same as that shown in FIG. 20A, so that almost no steer angle is formed for the rear wheels 17.

When the rear wheels have been steered after a series of operations of the rack 1162 explained above, the pinion 1161 has been rotated by the same amount as the rotation of the pinion 1131 such as to nullify the twisting of the torsion bar 1151. In consequence, the relative rotation between the control valve shaft 1151a and the rotary valve 1152 is eliminated to establish a neutral state, so that the supply of oil to the left or right power cylinder chambers is stopped to prevent further movement of the power piston 1172.

As will be clearly understood from the foregoing description, the rear wheel whel steering judging mechanism I incorporated in the seventh embodiment of the invention judges the speed of operation of the steering wheel and determines the direction and angle of steer of the rear wheels in accordance with the result of the judgement and the angle of rotation of the steering wheel. The judging mechanism I then, controls the actuating mechanism such as to impart the thus determined steer angle to the rear wheels in the thus determined direction. More specifically, when the steering wheel is being operated slowly, a rear wheel steer angle corresponding to the angle of rotational displacement of the steering wheel is generated in the same direction as the steer of the front wheels, whereas, when the steering wheel is being operated quickly, a rear wheel steer angle corresponding to the angle of rotational displacement of the steering wheel is generated in the direction counter to the direction of steer of the front wheels. When the steering wheel is being operated at a medium speed, the rear wheel steer angle is zero or substantially zero. Since the rear wheel steering judging mechanism is combined with the actuating mechanism which has a function to assist the steer of the rear wheel by hydraulic power, the manual force required for the driver to steer the rear wheels, as well as the front wheels, is decreased advantageously.

Figure 21:
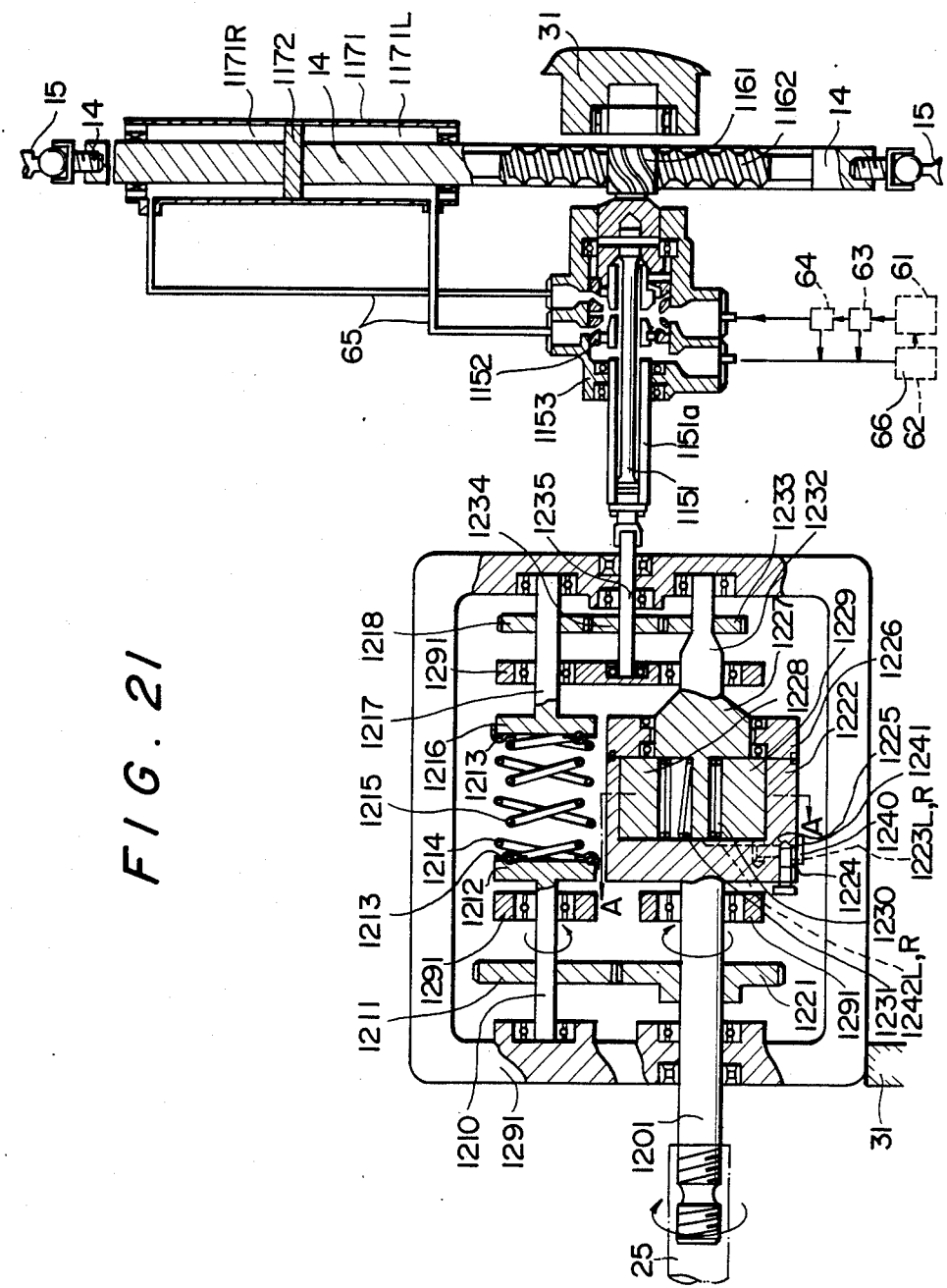
FIG. 21 is a sectional view of the hatched portion in FIG. 21A as viewed in the direction of lines B—B.
Figure 21A:
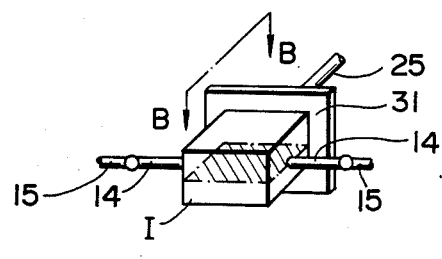
FIG. 21A is a perspective view of a rear wheel steer judging means incorporated in an eighth embodiment of the invention.

An eighth embodiment of the invention having a different rear wheel steering judging mechanism I will be explained hereinunder with reference to FIG. 21. FIG. 21 is a sectional view of the hatched portion in FIG. 21A as viewed in the direction of the arrow B—B. The rear wheel steering judging mechanism of the eighth embodiment differs from that in the seventh embodiment in that the input and output to and from the resilient member and the damper are rotational displacements.

The following description, therefore, will be focussed mainly on this point of difference. The input shaft 25 is integrally connected to one end of the input shaft 1201. The input shaft 1201 is rotatably supported through bearings on a case 1291 which is fixed to the bracket 31 and carries a spur gear 1221 for rotation therewith. The spur gear 1221 meshes with a driven spur gear 1211. These gears rotate in the counter directions at an equal speed. The spur gear 1211 is integrally fixed to the shaft 1210. The shaft 1210 is rotatably carried by the case 1291 through a bearing and is integrated at its end with a disk-shaped left spring seat 1212. A pair of springs 1214 and 1215 are secured at their one ends to the left spring seat 1212 by means of spring retainers 1213. These springs 1214 and 1215 are torsion coiled springs which are arranged to produce an equal resetting force when twisted in either direction. These springs are secured at their other ends to the right spring seat 1216 by means of spring retainers 1213. The right spring seat 1216 is integral with the shaft 1217 which is rotatably carried by the case 1291 through bearings. A spur gear 1218 is connected to the shaft 1217 for rotation integral therewith. The spur gear 1218 engages with a spur gear 1234 such that these gears rotate in the counter directions at an equal speed.

Figure 22:
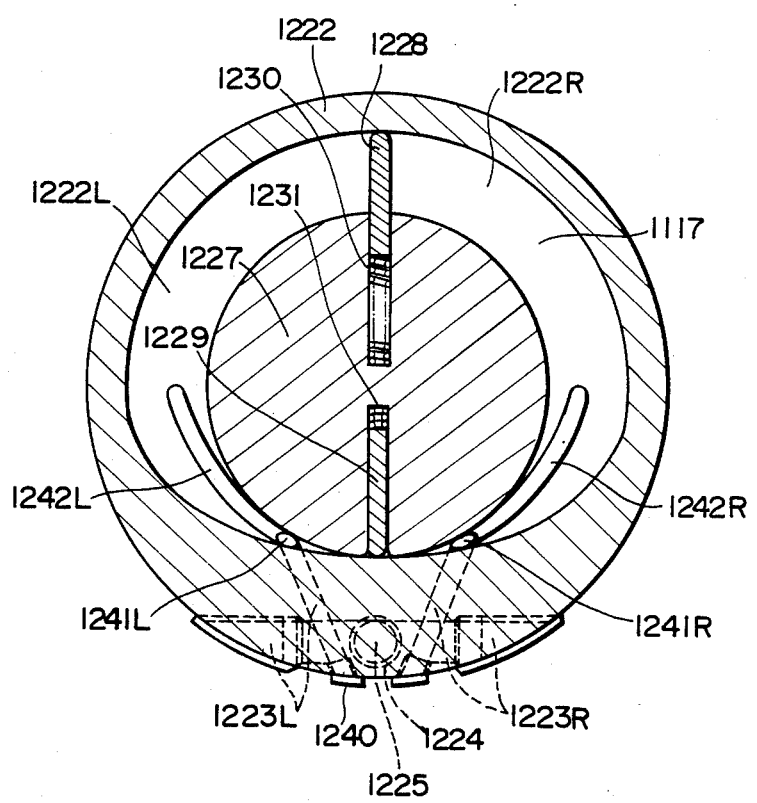
FIG. 22 is a sectional view taken along the line A—A of FIG. 21.

The other end of the input shaft 1201 is integrated with a cylinder 1222 of the oil damper and is connected to a cylinder cover 1226. As will be seen from FIG. 22, the cylinder 1222 is filled with a working oil 1117 and has an inner peripheral surface in the form of a cam ring contour. In the inner surface of the left end wall of the cylinder 1222 are formed two elongated grooves 1242L, 1242R and two ports 1241L, 1241R in communication with left and right by-pass conduits 1223L, 1223R formed in the cylinder. The left by-pass conduit 1223L and the right by-pass conduit 1223R are communicated with each other through an adjustable orifice 1225 which is controllable by means of the control valve 1224. The end of the by-pass conduits opening in the outer surface of the cylinder 1222 are closed by closure members 1240.

The cross-sectional area or the size of the orifice has been suitably determined by the control valve 1224. The depth and width of the grooves 1242L and 1242R also are have been selected suitably.

The cylinder 1222, cylinder cover 1226, rotor 1227 and the working oil 1117 in combination constitute an oil damper. The rotor 1227 has a pair of diametrically opposing vanes 1228, 1229. Springs 1230, 1231 acting on the bottoms of the vanes 1228, 1229 urge the rotors 1227 radially outwardly such that the ends of the vanes 1228, 1229 contact the cam ring contour on the inner peripheral surface of the cylinder 1222.

Referring again to FIG. 21, the rotor 1227 is rotatably carried by the cylinder cover 1226 and is integrally connected to a shaft 1232. The shaft 1232 is rotatably supported through bearings on the case 1291 and has a spur gear 1233 integral therewith, such as to rotate as a unit with the spur gear 1233. The spur gear 1233 meshes with the spur gear 1234 such that these spur gears rotate in the counter directions at an equal speed. The spur gear 1234 is integrally connected to an output shaft 1235 for rotation therewith. The output shaft 1235 is rotatably carried by the case 1291 through bearings and is connected at its end to a torsion bar 1151 and a control valve shaft 1151a. The arrangement for operatively connecting the torsion bar 1151 to the linkages 14 is identical to that in the seventh embodiment, so that the parts constituting this arrangement are denoted by the same reference numerals as those in the seventh embodiment and the description thereof is omitted.

A description will be made hereinunder as to the operation of the eighth embodiment. As in the case of the description of the seventh embodiment, the following description of operation of the eighth embodiment is made on an assumption that the steering wheel is rotated clockwise to steer the front wheels to the right.

In the eighth embodiment, the motion converting mechanism in the gear box 3 is designed such that the input shaft 25 is rotated in the direction of the arrow in FIG. 21, i.e., clockwise, in response to the clockwise rotation of the steering wheel, unlike the input shaft 25 of the seventh embodiment shown in FIG. 20. Namely, the gear box 3 has a construction as shown in FIG. 17. An input shaft 1201 is rotated clockwise in response to the clockwise rotation of the input shaft 25, whereas the shaft 1210 is rotated to the left, i.e., in the direction of the arrow annexed to the shaft 1210 shown in FIG. 21, through the pair of spur gears 1221, 1211. The counterclockwise rotation of the shaft 1210 causes a counterclockwise rotation of the left spring seat 1212 such as to twist the springs 1214, 1215 counter-clockwise, so that the springs 1214, 1215 produce resetting force which tends to rotate the right spring seat 1216 counter-clockwise. The counter-clockwise rotation of the right spring seat 1216 acts to rotate the spur gear 1218 in the same direction, through the shaft 1217.

Figure 23A:
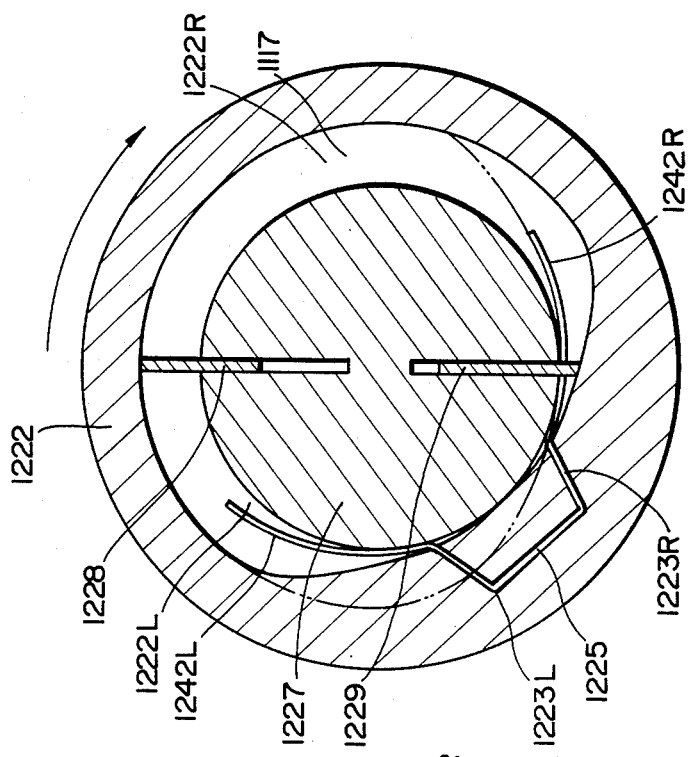
FIGS. 23A and 23B are sectional views similar to that n FIG. 22, illustrating the operation of the eighth embodiment.
Figure 23B:
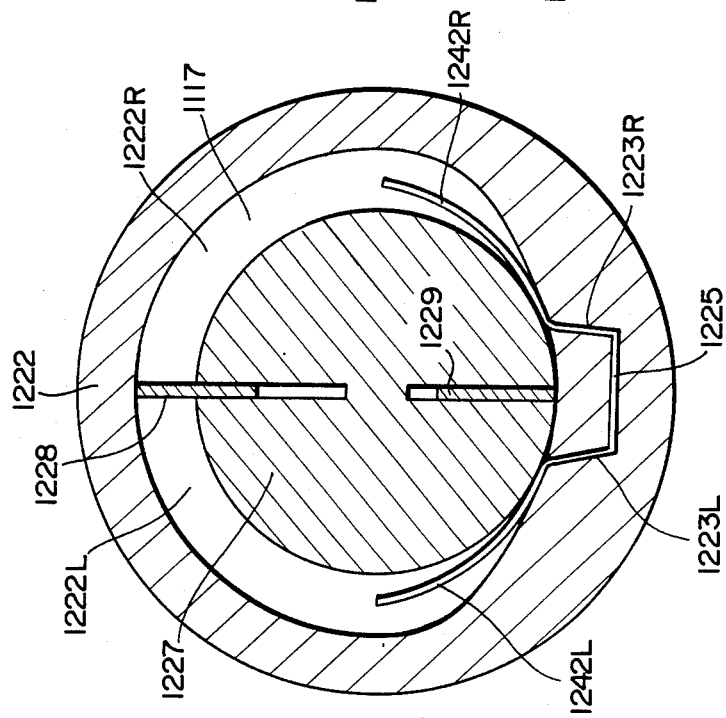

On the other hand, the clockwise rotation of the input shaft 1201 causes the cylinder 1222 to rotate clockwise from the position shown in FIG. 23A, as shown in FIG. 23B FIGS. 23A and 23B are explanatory sectional views. As a result of the clockwise rotation of the cylinder 1222 (direction of arrow in FIG. 23B, the volume of the left cylinder chamber 1222L is decreased to increase the pressure therein slightly, while the volume of the right cylinder chamber 1222R is increased to reduce its internal pressure slightly. In consequence, the working oil 1117 flows from the left cylinder chamber 1222L of the higher pressure to the right cylinder chamber 1222R of the lower pressure, through the groove 1242L, left by-pass conduit 1223L, orifice 1225, right by-pass conduit 1223R and the groove 1242R. This flow of the working oil produces a damping force corresponding to the speed of rotation of the cylinder 1222, such as to urge the vanes 1228, 1229 clockwise, causing the rotor 1227 to rotate clockwise. The clockwise rotation of the rotor 1227 acts to rotate the spur gear 1233 in the same direction through the shaft 1232. When the speed of rotation of the cylinder 1222, i.e., the speed of rotation of the input shaft 1201, is high, a large damping force is produced in the oil damper. This damping force overcomes the resetting force produced by the springs 1214, 1215 and causes a counter-clockwise rotation of the spur gear 1234 through the spur gear 1233, in response to the clockwise rotation of the rotor 1227. As a result, the spur gear 1218 is rotated counter-clockwise to largely twist the springs 1214, 1215. Therefore, when the steering wheel 1 is quickly rotated clockwise, the output shaft 1235 rotates counter-clockwise by an angle corresponding to the rotational displacement angle of the steering wheel, in accordance with the transfer function expressed by the formula (7).

On the other hand, when the speed of rotation of the cylinder 1222, i.e., the speed of rotation of the input shaft 1201, is low, the oil damper produces only a small damping force, so that the spur gear 1234 is rotated clockwise in response to the counter-clockwise rotation of the shaft 1217, by the resetting force of the springs 1214, 1215 transmitted through the spur gear 1218. In this case, the spur gear 1233 rotates counter-clockwise, allowing a large rotation of the rotor 1227 relative to the cylinder 1222. Thus, when the steering wheel 1 is slowly rotated clockwise, the output shaft 1235 is rotated clockwise by an angle corresponding to the angle of rotational displacement of the steering wheel 1.

When the cylinder 1222 is rotated at a medium speed, i.e., when the input shaft 1201 rotates at a medium speed between the speed of quick and slow steering operations explained above, the damping force produced by the oil damper is substantially balanced by the resetting force produced by the springs 1214, 1215. In this case, the spur gear 1234 does not rotate substantially, so that the output shaft 1235 does not rotate materially when the steering wheel 1 is being operated at a medium speed.

The rotation of the output shaft 1235 causes a twisting of the torsion bar 1151 which tends to rotate the pinion 1161 thereby moving the rack 1162 in the breadthwise direction of the vehicle body. The control valve shaft 1151a is rotated relative to the rotary valve 1152 by an angle corresponding to the angle of twist, such as to form a restriction in the hydraulic circuit. This restriction switches and controls the hydraulic pressure so that the stroke of the rack 1162 is determined to generate the determined rear wheel steer angle. As in the case of the seventh embodiment, this rear wheel steering operation is assisted by the hydraulic pressure difference between the left and right power cylinder chambers 1171L, 1171R of the power cylinder 1171.

It will be seen that, in the eighth embodiment of the invention, when the steering wheel 1 is being rotated clockwise such as to steer the front wheels to the right, the clockwise rotation of the output shaft 1235 causes the tie rod 15 to move to the left, i.e., downward as viewed in FIG. 21, through the rack 1162 and other members, thereby steering the rear wheels to the right, whereas the counter-clockwise rotation of the output shaft 1235 causes the tie rods 15 to be moved to the right, i.e., upward as viewed in FIG. 21, through the racks and other associated members, thereby steering the rear wheels to the left.

As will be understood from the foregoing description, according to the eighth embodiment of the invention, the rear wheel steering judging mechanism judges the speed of operation of the steering wheel and determines the direction and angle of steer of rear wheels in accordance with the result of judgement and the rotational displacement angle of the steering wheel. The judging mechanism then operates the actuating mechanism such as to steer the rear wheels in the thus determined direction by the thus determined angle. In addition, since the actuating mechanism incorporates a power steering device which assists the manual steering force by hydraulic pressure, the manual steering force required for steering the rear wheels, as well as the front wheels, is decreased advantageously. In addition, since the major parts including the springs and oil damper are designed to operate with input and output in the form of rotational displacements, it is easy to optimize the ratio of the steer angle of the rear wheels to the angle of rotational displacement of the steering wheel, by suitably selecting and combining the ratios of rotation speeds of these major parts.

Figure 24:
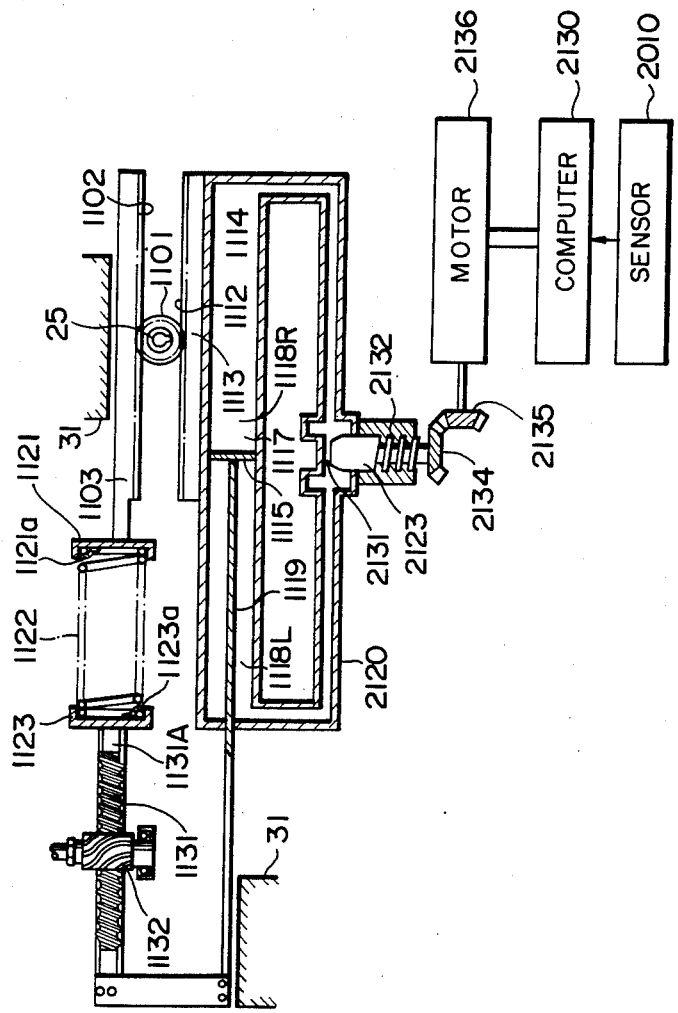
FIG. 24 is a fragmentary sectional view of a ninth embodiment, showing a section similar to that in FIG. 18.

A description will be made hereinunder as to a ninth embodiment of the invention. This embodiment is designed such that the cross-sectional area or the size of an orifice provided in the rear wheel steering judging mechanism is automatically controlled in accordance with a physical amount concerning the vehicle speed. FIG. 24 shows the ninth embodiment which is basically the same as the seventh embodiment except that a variable orifice is provided in the rear wheel steering judging mechanism. In this Figure, therefore, the same reference numerals are used to denote the parts which are the same as those used in the seventh embodiment, and detailed description of such parts is omitted.

As shown in FIG. 24, the cylinder 1114 is provided with a by-pass conduit 2120 which provides a communication between the left and right cylinder chambers 1118L and 1118R. The piston 1115 does not have an orifice. A control valve 2123 provided substantially at the mid point of the by-pass conduit 2120 is movable in the direction perpendicular to the length of the by-pass conduit such as to project into the same. The upper end of the control valve 2123 and the opposing inner surface of the by-pass conduit 2120 constitute an orifice 2131. The arrangement is such that the cross-sectional area or the size of the orifice is changed by the movement of the control valve 2123. The control valve 2123 has an adjusting screw 2132 fixed thereto and integrally connected to a bevel gear 2134 which meshes with another bevel gear 2135 such as to form a pair of miter gears. The bevel gear 2135 is connected to the shaft of a motor 2136 for rotation therewith. The motor 2136, which is reversible, is secured to the outer surface of the by-pass conduit 2120 by a suitable retainer, such as to move to the left and right as a unit with the cylinder 1114, and is electrically connected to a microcomputer 2130 on the vehicle such as to be controlled by the microcomputer 2130. A vehicle velocity detector 2010 is connected to the microcmputer 2130. The vehicle velocity detector 2010 is identical to the vehicle velocity detector 200 shown in FIGS. 8A, 8B, 9A and 9B, so that the description thereof is omitted.

Therefore, when the vehicle velocity is low, the microcomputer 2130 produces a control signal and delivers the same to the motor 2136 such as to fully close the orifice 2131, so that the damper produces a damping force which is sufficiently larger than the resetting force of the coiled spring 1122, regardless of the speed of rotation of the input shaft 25. In this case, therefore, the linkage is moved almost solely by the damping force of the damper, in the same direction as the movement of the rack 1112.

Thus, when the vehicle velocity is low, the rear wheels are steered in the direction counter to the direction of steer of the front wheels, regardless of the speed of operation of the steering wheel.

On the other hand, when the vehicle is running at a high speed, the microcomputer 2130 produces a control signal and delivers the same to the motor 2136 such as to fully open the orifice 2131. In this case, the damping force of the damper is sufficiently smaller than the resetting force of the coiled spring 1122, so that the linkage 14 is moved almost solely by the resetting force of the coiled spring 1122, in the same direction as the rack 1102. In consequence, when the vehicle velocity is high, the rear wheels are steered in the same direction as the front wheels, regardless of the speed of rotation of the steering wheel.

Thus, in this ninth embodiment of the invention, the rear wheel steer angle is formed in the counter direction to the direction of steer of the front wheels such as to improve the turning performance of the vehicle whenever the vehicle is running at low speed, whereas, when the vehicle is running at high speed, the rear wheel steer angle is formed in the same direction as the front wheels such as to prevent any drastic increase of the sensitivity to the turning steering input, thereby improving the steering stability. On the other hand, when the vehicle is running at medium speed, the direction of the rear wheel steer angle is controlled in accordance with the speed of rotation of the steering wheel such that, when the steering wheel is being operated quickly, the steering gain is increased to improve the response to the steering input for quick turning of the vehicle, while, when the steering wheel is being operated slowly, the steering gain is decreased to prevent the yaw and fluctuation of the vehicle thereby improving the running stability during straight running of the vehicle.

It is to be noted also that the yaw rate or the lateral acceleration of the vehicle can be used as the physical amount relating to the vehicle speed, in place of the vehicle velocity itself, for the purpose of controlling the size of the orifice. Since such modifications are already explained in connection with FIGS. 10a and 10B, the detail of such modifications are not described here.

Figure 25:
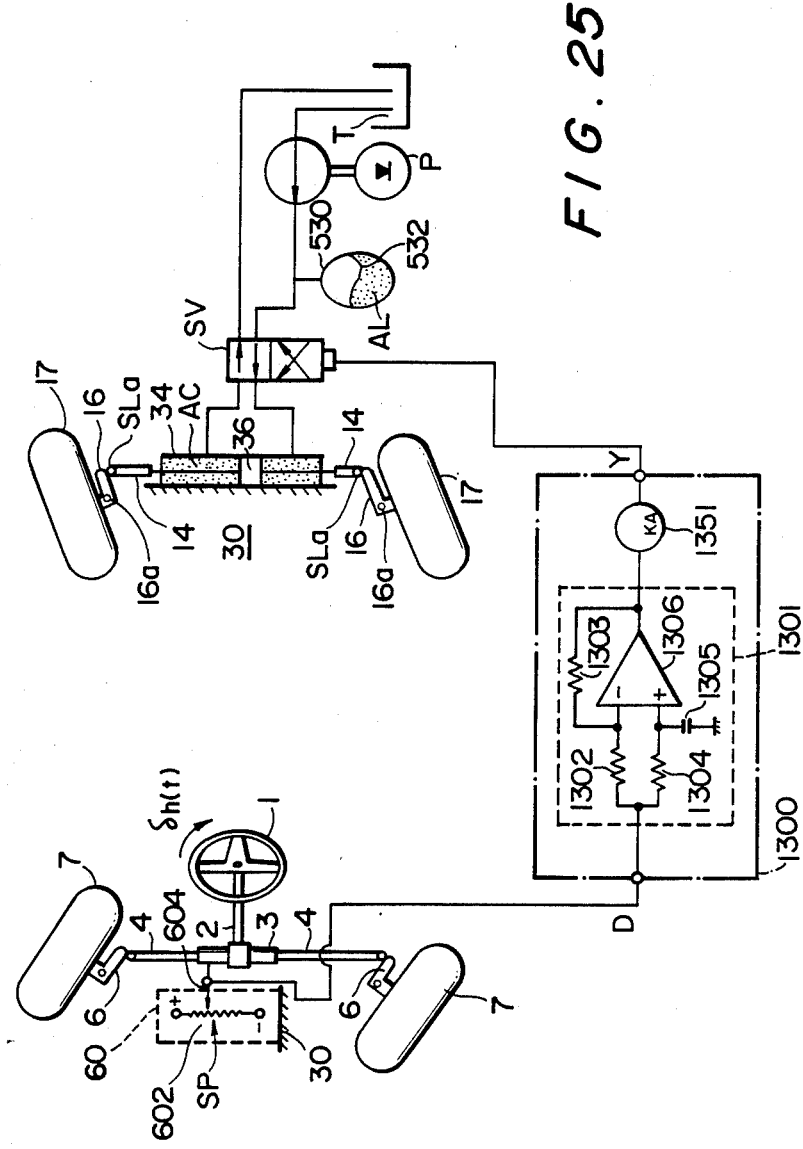
FIG. 25 is a block diagram of a tenth embodiment.

A tenth embodiment of the invention will be described hereinunder with reference to FIG. 25. In this embodiment, the rear wheel steering judging mechanism is constituted by an electric circuit which produces a signal for switching the control valve of the actuating mechanism.

A detection circuit 60 for detecting the rotational displacement of the steering wheel includes a linear resistor 602 and a slider 604 which in combination constitute a linear potentiometer SP fixed to the vehicle body 30. The slider 604 is connected at its one end to a gear accommodated by the gear box 3. A rotation of the shaft 2 in response to the angle $\delta h(t)$ of rotation of the steering wheel 1 is converted into a linear motion of the gear connected to the slider 604, by means of the motion converting mechanism such as a rack-and-pinion accommodated by the gear box 3. The linear potentiometer SP of the detecting circuit 60 detects this linear motion as a displacement corresponding to the angle $\delta h(t)$ of steer of the steering wheel 1, and delivers a corresponding voltage signal as a displacement signal D. For the simplification of the description, an assumption is made here that the steering wheel 1 is being continuously operated in the form of sine wave at an angular frequency $\omega$. In this case, the angle $\delta h(t)$ of rotation of the steering wheel is expressed as $\omega t$, so that the rotational displacement of the steering wheel from the neutral position, i.e., the position for straight running, is expressed as $\delta h_0 \sin \omega t$, where $\delta h_0$ represents the amplitude of the steering wheel. In consequence, the displacement signal D delivered by the linear potentiometer SP takes the form of a continuous voltage signal $D = D_0 \sin \omega t$ having the amplitude $D_0$ corresponding to the amplitude of the steering wheel and having an angular frequency.

The rear wheel steering judging mechanism also includes a signal processing circuit 1300 which is composed of a phase shifting circuit 1301 connected to the slider of the detecting means 60 and a coefficient device 1351.

The phase shift circuit 1301 is constituted by an operational amplifier 1306, resistors 1302, 1303, 1304 and a capacitor 1305. The resistors 1302 and 1303 are an input resistor and a feedback resistor, respectively, having the same resistance value. The resistor 1304 and the capacitor 1305 serve as a judging circuit, while the resistors 1302, 1303, operational amplifier 1306 and the coefficient device 1351 operate as a control circuit.

In the phase shift circuit 1301, when the angular velocity $\omega$ of the displacement signal as the input is small to approximate zero, the capacitor 1305 exhibits a reactance which approaches infinity, so that the positive terminal of the operational amplifier 1306 receives a signal through the resistor 1304 which in turn is supplied with the displacement signal D at its one end. Since the displacement signal D is supplied also to the input resistor 1302, and since the ratio of resistance between the input resistor 1302 and the feedback resistor 1303 is 1, a signal with a gain "−1" is produced in response to the signal supplied to the negative terminal of the operational amplifier 1306, while a signal of a gain "2" is obtained from the signal supplied to the positive terminal of the operational amplifier 1306, so that the phase shift circuit 1301 as a whole provides an output of a gain which is "1" (2−1=1). Therefore, when the angular frequency of the displacement signal D approaches zero, an output signal D which is equal to the input displacement signal D is obtained.

Conversely, when the input displacement signal D has a large angular frequency approaching infinity, the capacitor 1305 is substantially short-circuited, so that the condition becomes equivalent to the case where the positive terminal of the operational amplifier 1306 is grounded. In this case, therefore, only the negative terminal receives the signal and, hence, the phase shift circuit 1301 performs only the function of an inverting amplifier. In this case, the gain is "−1" because the ratio of resistance between the input resistor 1302 and the feedback resistor 1303 is "1". Consequently, when the angular frequency $\omega$ of the displacement signal D is as large as infinity, the output −D is obtained in response to the input displacement signal D. That is, the output signal has the same absolute value (amplitude $D_0$) as the input signal and a phase delay of 180° from the phase of the input signal.

Thus, in the tenth embodiment of the invention, the phase shift circuit 1301 produces an output the phase of which is delayed within the range of between 0° and 180° from the phase of the input displacement signal D, the amount of phase delay being increased as the angular frequency of the input signal D is increased.

The coefficient device 1351 is adapted to output a control signal Y which is obtained by amplifying the output of the phase shift circuit 1301 with a predetermined coefficient $K_A$.

The operation mechanism is constituted by a hydraulic pressure generator P, accumulator AL, flow-rate control valve SV, oil reservoir T connected to the suction side of the pressure generator P and adapted to receive the unnecessary oil, actuator AC connected through a pipe to the flow rate control valve SV and capable of serving as a power cylinder, knuckle arms 16 having pivot shafts 16a, and steering linkages 14, 14 which connect the left and right knuckle arms 16, 16 through pin joints SLa, SLa.

The hydraulic pressure generator P includes a vane pump which is driven by the engine through pulleys such as to produce a predetermined hydraulic pressure which is accumulated in the accumulator AL.

The accumulator AL is composed of a metallic container 530 having a predtermined capacity. The space inside the metallic container is divided by a rubber diaphragm 532 into two chambers one of which is filled with a gas such as nitrogen of a predetermined pressure while the other is communicated with the discharge side of the vane pump of the hydraulic pressure generator P through a pipe.

The accumulator AL is intended for ensuring the operation of the rear wheel steering system in the event that the capacity of the vane pump is insufficient for the demand by the rear wheel steering system. By providing the accumulator AL, it is possible to reduce the size and capacity of the vane pump. The accumulator AL is connected through a pipe to the flow rate control valve SV so that it delivers the hydraulic pressure to the actuator AC at a rate which is controlled in accordance with the degree of opening of the flow rate control valve SV.

The flow rate control valve SV is constituted by a spool valve having a cylinder provided with inlet and outlet ports and a spool which is axially movable in the cylinder. The positional relationship between the spool and the outlet port is changed in accordance with the control signal from the signal processing circuit 1300, so that the area of the restriction is changed to control the flow rate.

The actuator AC is constituted by a cylinder 34 connected through a pipe to the flow rate control valve SV and a piston 36 axially movable in the cylinder 34. The cylinder 34 is fixed to the vehicle body 30 while the piston 36 is connected at both its ends to the left and right steering linkages 14,14.

The operation of this tenth embodiment is as follows. It is assumed here that the steering wheel 1 is operated continuously in the form of a sine wave with an amplitude $\delta h_0$ and angular frequency $\omega$, i.e., at a speed expressed by $\delta h(t) = \delta h_0 \cdot \sin \omega t$. In response to this steering input, the detecting means 60 produces a continuous sine wave displacement signal $D = D_0 \sin \omega t$ having an amplitude $D_0$ and angular frequency $\omega$. The signal processing circuit 1300 processes this displacement signal D in accordance with the angular frequency $\omega$ and produces a control signal Y.

The flow rate control valve SV of the actuating mechanism changes the area of the restriction thereof in accordance with the control signal Y, so that the hydraulic pressure in the accumulator AL is delivered to the actuator AC at a rate controlled by the flow rate control valve SV. In consequence, the internal pressure of the actuator AC is changed to drive the piston, so that the knuckle arms 16 of the actuating mechanism are pivoted about the pivot shafts 16a. Since the left and right knuckle arms 16, 16 are connected through the steering linkages 14, the left and right rear wheels 17, 17 are steered at a steer angle $\delta r(t)$ by the pivot motion of the knuckle arms 16, 16. Needless to say, the front wheels 7,7 also are steered at an angle $\delta f(t)$ in the same direction as the direction of rotation of the steering wheel 1, in response to the steering of the steering wheel 1.

In this embodiment, the steer angle $\delta r(t)$ of the rear wheels 17 is determined in accordance with the operation characteristics of the signal processing circuit which will be described in detail hereinunder with reference to FIGS. 26A to 26D.

Figure 26A:
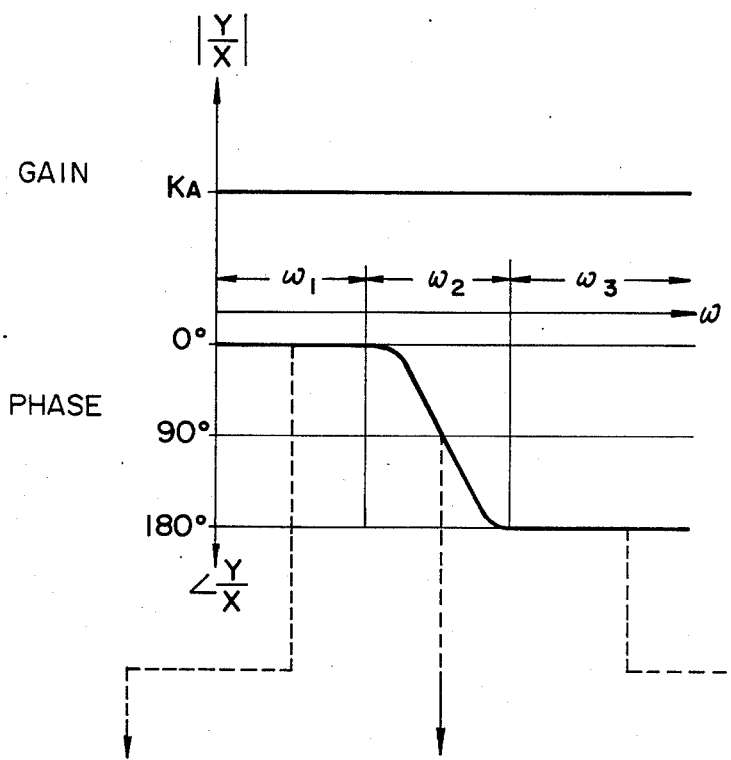
FIG. 26A is a diagram showing the gain and phase in a signal processing circuit of the tenth embodiment of the invention.
Figures 26B, 26C, 26D:
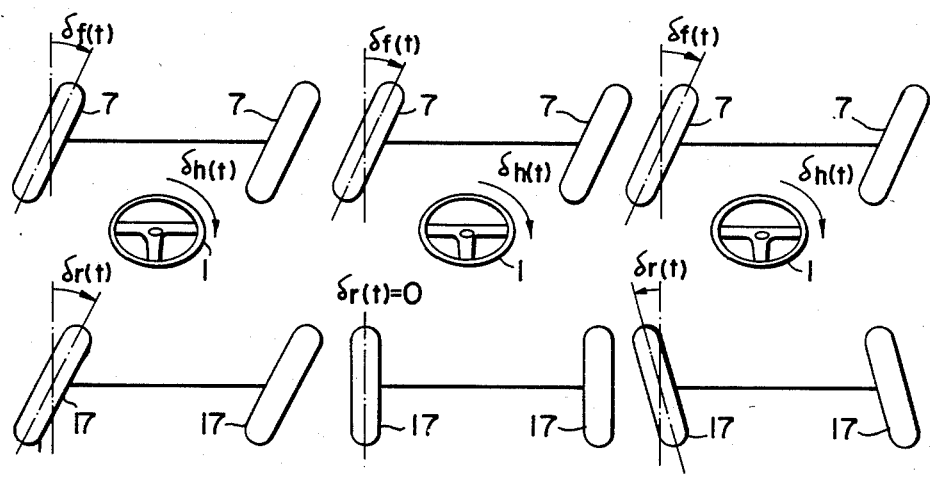
FIGS. 26B, 26C and 26D are illustrations of the steer angles of front and rear wheels corresponding to the gains and phases shown in FIG. 26A.

FIG. 26A shows the characteristics of the signal processing circuit 1300. The signal processing circuit 1300 is adapted to produce the output Y in response to the input displacement signal $D = D_0 \sin \omega t$ at a constant gain $K_A$ and a phase delay which varies between 0° and 180° in accordance with the increase in the angular frequency $\omega$. When the angular frequency $\omega$ is within a low range expressed by $\omega_1$, the signal processing circuit produces an output signal $Y = K_A D$ which is obtained by multiplying the input signal by the constant gain $K_A$, and the rear wheels are steered by the actuating mechanism in accordance with the control signal Y. In this case, the steer angle $\delta r(t)$ of the rear wheels 17 appears in the same direction as the angle $\delta f(t)$ of steer of the front wheels 7, as shown in FIG. 26B. The value of the angle of steer of the rear wheels is proportional to the rotational displacement of the steering wheel.

Conversely, when the angular frequency $\omega$ of the displacement signal D is within a high range $\omega_3$, the signal processing circuit produces a signal with a phase delay of 180° with respect to the input signal, i.e., a control signal $Y = -K_A D$ which is obtained by multiplying the displacement signal D by $-K_A$. The rear wheels are steered by the actuating mechanism in response to this control signal Y. In this case, as shown in FIG. 26D, the rear wheel steer angle $\delta r(t)$ appears in the counter direction to the front wheel steer angle $\delta f(t)$ and the value thereof is proportional to the rotational displacement of the steering wheel.

When the angular frequency $\omega$ of the displacement signal falls within a medium range $\omega_2$ intermediate the low and high ranges $\omega_1$ and $\omega_3$ mentioned above, the signal processing circuit produces the control signal Y at a phase delay which is variable from 0° to 180°. When the phase of the control signal Y delivered by the signal processing circuit is delayed 90° from the phase of the input signal, the actuating mechanism steers the rear wheels with a delay from the steering of the front wheels, such that the steer angle $\delta r(t)$ of the rear wheels becomes zero when the steer angle $\delta f(t)$ of the front wheels is maximized.

If necessary, the tenth embodiment described hereinbefore may be provided with a means for detecting the steer angle of the rear wheels and a feedback control means which controls the flow rate control valve SV in accordance with an offset of the output of the above-mentioned detecting means from the control signal delivered by the signal processing circuit 1300.

Although in the seventh and eighth embodiments the actuating mechanism is constituted by a combination of a rotary valve and a rack-and-pinion, this is not exclusive and the actuating mechanism can have various types of control valves and motion converting mechanisms, as well as various shapes and arrangements of the cylinder. For instance, the actuating mechanism in the apparatus of the invention may be of an integral type adapted to operate by means of a flapper valve, or of a type responsive to a physical amount in which the by-pass circuit is opened or closed by a solenoid valve under the control of a computer which operates upon detection of the physical amount.

In addition, the actuating mechanism for generating the rear wheel steer angle can incorporate a power steering system which assists the manual steering power. In such a case, advantages are brought about besides those described hereinbefore, such as free selection of the ratio of the rear wheel steer angle to the rotational displacement of the steering wheel by virture of elimination of the limitation from the steering force, and prevention of transmission of kick-back or shimmy from the road surface.

Although the invention has been described through specific terms, it is to be noted here that the embodiments described hereinbefore are not exclusive and various changes and modifications may be imparted thereto without departing from the scope of the invention which is limited solely by the appended claims.

What is claimed is:

1. An apparatus for controlling steer angle or rear wheels of a vehicle in accordance with the operation of a steering wheel for generating steer angle of front wheels, said apparatus comprising:
    a first member movable in response to the operation of said steering wheel;
    a second member movable in response to the operation of said steering wheel in the counter direction to the direction of movement of said first member;
    an output shaft for controlling the steer angle of said rear wheels;
    a resilient member disposed between said first member and said output shaft; and
    controlling means disposed between said second member and said output shaft for controlling a direction of movement of said output shaft in accordance with a speed of operation of said steering wheel;
    wherein when said steering wheel is being operated at high speed, said controlling means includes means for causing said output shaft to move in the same direction as said second member by transmitting a force resulting from the movement of said second member to said output shaft and by causing said resilient member to be resiliently deformed so as to absorb a force resulting from the movement of said first member, whereas when said steering wheel is being operated at low speed, said controlling means includes means for damping the force resulting from movement of said second member so as to allow the force resulting from movement of said first member to be transmitted to said output shaft through said resilient member so that said output shaft is moved in the same direction as said first member;
    whereby the steer angle of the rear wheels is generated in a direction counter to a direction of the steer angle of the front wheels when said steering wheel is being operated at hight speed, whereas the steer angle of the rear wheels is generated in the same direction as the steer angle of said front wheels when said steering wheel is being operated at low speed.

2. An apparatus for controlling steer angle of rear wheels of a vehicle according to claim 1, wherein said controlling means includes dash pot means filled with a fluid and incorporating an orifice which imposes a flow resistance on said fluid, due to viscosity of said fluid, in such a manner as to drive said output shaft in the same direction as said second member when said second member is moving at high speed, and to drive the output shaft in the same direction as said first member when said second member is moving at low speed.

3. An apparatus for controlling steer angle of rear wheels of a vehicle according to claim 1, further comprising an actuating mechanism provided between said rear wheels and said controlling means, said actuating mechanism including an actuator connected at its output side to steering linkages and having two actuator chambers separated by an actuator piston, a hydraulic pressure generating means, and a control valve which is adapted to switch communication passages between said hydraulic pressure generating means and said two actuator chambers in accordance with the direction of movement of said output shaft.

4. An apparatus for controlling steer angle of rear wheels of a vehicle according to claim 1, wherein said first member makes a linear movement in response to operation of said steering wheel, while said second member makes a linear movement in the direction counter to the direction of movement of said first member.

5. An apparatus for controlling steer angle of rear wheels of a vehicle according to claim 4, further comprising a pinion adapted to be rotated by the operation of said steering wheel, wherein said first and second members are constituted by first and second racks meshing with said pinion in a position of symmetry with each other with respect to said pinion.

6. An apparatus for controlling steer angle or rear wheels of a vehicle according to claim 2, wherein said dash pot means includes a dash pot cylinder fixed to said second member, a dash pot piston connected to said output shaft and dividing a space in said dash pot cylinder into two dash pot chambers, and an orifice providing a communication between said two dash pot chambers.

7. An apparatus for controlling steer angle of rear wheels of a vehicle according to claim 1, wherein said resilient member is a spring connected at its one end to said first member and at its other end to said output shaft.

8. An apparatus for controlling steer angle of rear wheels of a vehicle according to claim 6, wherein said orifice is formed in said piston.

9. An apparatus for controlling steering angle of rear wheels of a vehicle according to claim 6, wherein said two dash pot chambers in said dash pot cylinder are communicated with a by-pass conduit in which said orifice is provided for free adjustment of the cross-sectional area of said by-pass conduit.

10. An apparatus for controlling steer angle of rear wheels of a vehicle according to claim 1, wherein said first member is rotated by the operation of said steering wheel, while said second member is rotated in the direction counter to the direction of rotation of said first member.

11. An apparatus for controlling steer angle of rear wheels of a vehicle according to claim 10, further comprising an input shaft to be rotated upon operation of said steering wheel, wherein said first member is rotatably and, coaxially supported by said input shaft and is driven by said input shaft in a direction counter to the direction of said input shaft through a gear mechanism, while said second member is integrally and coaxially connected to said input shaft so as to rotate in the same direction as said input shaft.

12. An apparatus for controlling steer angle of rear wheels of a vehicle according to claim 11, wherein said controlling means includes a rotor integrally connected to said input shaft and serving as said second member, an output housing coaxially connected to said output shaft and accommodating said rotor, vanes projecting radially outwardly from said rotor and dividing a space between said output housing and said rotor into two chambers, and an orifice providing a communication between said two chambers, said first member being connected to said output housing through said resilient member.

13. An apparatus for controlling steer angle of rear wheels of a vehicle according to claim 12, wherein said resilient member includes a pair of coiled springs connected at their one ends to said first member and at their other ends to said output housing, said springs being twisted in counter directions to each other.

14. An apparatus for controlling steer angle of rear wheels of a vehicle according to claim 2, wherein said controlling means includes dash pot means provided with a variable orifice, said apparatus further comprising a physical amount detecting means for detecting a physical amount relating to a vehicle velocity, an orifice controlling means maximizing and minimizing the passage area in said orifice, respectively, when said physical amount is large and small.

15. An apparatus for controlling steer angle or rear wheels of a vehicle according to claim 14, wherein said dash pot means includes a dash pot cylinder fixed to said second member, a dash pot piston dividing a space in said cylinder into two dash pot chambers and fixed to said output shaft, a by-pass conduit providing communication between said two dash pot chambers, and a control valve extended into said by-pass conduit so as to be able to vary the passage area of said by-pass conduit thus serving as said variable orifice.

16. An apparatus for controlling steer angle of rear wheels of a vehicle according to claim 15, further comprising a motor for driving said control valve, said motor being controlled by said controlling means which receives a physical amount signal from said physical amount detecting means.

17. An apparatus for controlling steer angle of rear wheels of a vehicle according to claim 14, wherein said physical amount is the vehicle velocity.

18. An apparatus for controlling steer angle of rear wheels of a vehicle according to claim 14, wherein said physical amount is a yaw rate or a lateral acceleration of said vehicle.

19. An apparatus for controlling steer angle of rear wheels of a vehicle according to claim 14, further comprising an input shaft to be rotated upon operation of said steering wheel, wherein said first member is rotatably and coaxially supported by said input shaft and is driven by said input shaft in a direction counter to the direction of said input shaft through a gear mechanism, while said second member is integrally and coaxially connected to said input shaft so as to rotate in the same direction as said input shaft.

20. An apparatus for controlling steer angle of rear wheels of a vehicle according to claim 19, wherein said dash pot means includes a rotor integrally connected to said input shaft and serving as said second member, an output housing coaxially connected to said output shaft and accommodating said rotor, vanes projecting radially outwardly from said rotor and dividing a space between said output housing and said rotor into two dash pot chambers, a by-pass conduit providing a communication between said two dash pot chambers, and a control valve projecting into said by-pass conduit so as to by able to adjust the passage area of said by-pass conduit thus serving as said variable orifice.

21. An apparatus for controlling steer angle of rear wheels of a vehicle according to claim 20, wherein said resilient member includes a pair of coiled springs which are fixed at their one ends to said first member and at their other ends to said output housing, said coiled springs being twisted in counter directions to each other.

22. An apparatus for controlling steer angle or rear wheels of a vehicle according to claim 3, wherein said actuator mechanism includes:
steering linkages extending in the breadthwise direction of a vehicle body and connected to knuckle arms for steering the rear wheels, said steering linkages being adapted to be driven linearly in the breadthwise direction of the vehicle body by said output shaft;
an actuator cylinder fixed to said vehicle body and slidably penetrated by said steering linkages;
an actuator piston connected to said steering linkage and dividing a space in said actuator cylinder into two actuator chambers;
a hydraulic pressure generating means for generating a hydraulic pressure when driven by an engine of said vehicle;
a hydraulic conduit means providing communication between said two actuator chambers in said actuator cylinder and said hydraulic pressure generating means; and
a switching controlling means provided in said hydraulic conduit means and driven by said output shaft for switching supply and discharge of the hydraulic pressure to and from said two actuator chambers in said actuator cylinder.

23. An apparatus for controlling steer angle of rear wheels of a vehicle according to claim 22, further comprising means for assisting a steering of said front wheels, said assisting means including:
a front wheel power cylinder arranged so as to be penetrated by front wheel steering linkages connected to said front wheels;
a front wheel power piston connected to said front wheel linkages and dividing a space in said front wheel power cylinder into two power chambers; and
switching valve means adapted to be operated in response to the operation of said steering wheel so as to selectively bring said power chambers in said front wheel power cylinder into communication with said hydraulic pressure generating means in said actuating mechanism.

24. An apparatus for controlling steer angle of rear wheels of a vehicle according to claim 22, further comprising:

detecting circuit means for producing a steering wheel displacement signal upon detection of the rotational displacement of said steering wheel;

judging circuit means for judging the speed of operation of said steering wheel in accordance with said steering wheel displacement signal; and control circuit means for operating said switching controlling means in accordance with the result of judgement by said judging circuit means such that, when said steering wheel is being operated quickly, the rear wheel steer angle is generated in a direction counter to the direction of steering of said front wheels, whereas when said steering wheel is being operated slowly, the rear wheel steer angle is generated in the same direction as the front wheel steer angle.

* * * * *